(12) United States Patent
Cohen et al.

(10) Patent No.: US 10,500,990 B2
(45) Date of Patent: Dec. 10, 2019

(54) CAR SEAT

(71) Applicant: Pidyon Controls Inc., New York, NY (US)

(72) Inventors: Yochanan Cohen, New York, NY (US); Velissa Van Scoyoc, Philadelphia, PA (US); Ahmet Becene, West Simsbury, CT (US); Alexis Grant, Allentown, PA (US); Steven Roy Duke, Huntersville, NC (US); Ekaterina Kravchenko, Philadelphia, PA (US)

(73) Assignee: Pidyon Controls Inc., New York, NY (US)

( * ) Notice: Subject to any disclaimer, the term of this patent is extended or adjusted under 35 U.S.C. 154(b) by 0 days.

(21) Appl. No.: 16/289,801

(22) Filed: Mar. 1, 2019

(65) Prior Publication Data
US 2019/0193606 A1 Jun. 27, 2019

Related U.S. Application Data

(60) Division of application No. 14/838,847, filed on Aug. 28, 2015, now Pat. No. 10,220,734, which is a
(Continued)

(51) Int. Cl.
  *B60N 2/28* (2006.01)
  *B60N 2/54* (2006.01)

(52) U.S. Cl.
  CPC ......... *B60N 2/2884* (2013.01); *B60N 2/2806* (2013.01); *B60N 2/286* (2013.01);
  (Continued)

(58) Field of Classification Search
  CPC .. B60N 2/2884; B60N 2/2887; B60N 2/2806; B60N 2/2863; B60N 2/2845; B60N 2/2812; B60N 2/2821; B60N 2002/2818
  (Continued)

(56) References Cited

U.S. PATENT DOCUMENTS 2,911,652 A  11/1959  Ekman
3,015,104 A  1/1962  Crosson et al.
(Continued)

FOREIGN PATENT DOCUMENTS

AU  200129824 A1  10/2001
CN  201320533171.1  8/2013
(Continued)

OTHER PUBLICATIONS

Children, NHTSA Traffic Safety Facts, 2003, National Center for Statistics and Analysis, DOT HS 809 762.
(Continued)

*Primary Examiner* — Paola Agudelo
*Assistant Examiner* — Adam G Barlow
(74) *Attorney, Agent, or Firm* — Gordon & Jacobson, P.C.

(57) ABSTRACT

Embodiments of a car seat include an outer protective shell, an inner seat, a suspension system connecting and permitting relative movement between the inner seat and the outer protective shell. The suspension system may include a plurality of deformable webs. Also, at least one padding element may be in contact with and interposed between the outer protective shell and the inner seat. In an accident, regardless of the direction in which the seat is facing and regardless of whether the result is a sudden acceleration and/or deceleration, the inner seat will move inside the frame, and the suspension system will absorb some, much, or all of the energy either by elastic or plastic deformation. Energy not absorbed by the suspension system may be absorbed by the inner seat itself and/or an anchor system used to connect the car seat to a vehicle.

7 Claims, 28 Drawing Sheets

Related U.S. Application Data continuation-in-part of application No. 14/197,855, filed on Mar. 5, 2014, now Pat. No. 9,487,110, and a continuation-in-part of application No. PCT/US2014/020527, filed on Mar. 5, 2014, which is a continuation-in-part of application No. 13/785,555, filed on Mar. 5, 2013, now Pat. No. 8,911,015.

(60) Provisional application No. 62/043,947, filed on Aug. 29, 2014.

(52) U.S. Cl.
CPC ......... *B60N 2/2812* (2013.01); *B60N 2/2821* (2013.01); *B60N 2/2845* (2013.01); *B60N 2/2863* (2013.01); *B60N 2/2887* (2013.01); *B60N 2/54* (2013.01); *B60N 2002/2818* (2013.01)

(58) Field of Classification Search
USPC ... 297/216.1, 216.11, 250.1, 216.13, 216.14, 297/216.16
See application file for complete search history.

(56) References Cited

U.S. PATENT DOCUMENTS

| | | |
|---|---|---|
| 3,023,134 A | 2/1962 | Creswell et al. |
| 3,174,155 A | 3/1965 | Pitman |
| 3,186,004 A | 6/1965 | Carlini |
| 3,320,619 A | 5/1967 | Latsnik et al. |
| 3,479,666 A | 11/1969 | Webb |
| 3,577,562 A | 5/1971 | Holt |
| 3,818,508 A | 6/1974 | Lammers |
| 3,906,546 A | 9/1975 | Gooding |
| 3,957,303 A | 5/1976 | Mauron |
| 4,101,983 A | 7/1978 | Dera et al. |
| 4,106,124 A | 8/1978 | Green |
| 4,345,338 A | 8/1982 | Frieder, Jr. et al. |
| 4,484,364 A | 11/1984 | Mitchell et al. |
| 4,599,752 A | 7/1986 | Mitchell |
| 4,690,455 A | 9/1987 | Bailey et al. |
| 4,845,786 A | 7/1989 | Chiarella |
| 4,913,490 A | 4/1990 | Takashi |
| 4,937,888 A | 7/1990 | Straus |
| 4,972,527 A | 11/1990 | Wallace |
| 5,018,220 A | 5/1991 | Lane et al. |
| 5,143,420 A | 9/1992 | Switlik |
| 5,149,165 A | 9/1992 | Woolley |
| 5,204,998 A | 4/1993 | Liu |
| 5,213,393 A | 5/1993 | Maurer et al. |
| 5,259,071 A | 11/1993 | Scott et al. |
| 5,324,064 A | 6/1994 | Sumser et al. |
| 5,409,294 A | 4/1995 | Czernakowski |
| 5,451,094 A | 9/1995 | Templin et al. |
| 5,466,044 A | 11/1995 | Barley et al. |
| 5,475,878 A | 12/1995 | Dawn et al. |
| 5,611,596 A | 3/1997 | Barley et al. |
| 5,630,645 A | 5/1997 | Lumley et al. |
| 5,638,544 A | 6/1997 | Sump |
| 5,680,656 A | 10/1997 | Gath |
| 5,724,681 A | 3/1998 | Sykes |
| 5,758,859 A | 6/1998 | Gonzalez |
| 5,845,968 A | 12/1998 | Lovie |
| 5,916,828 A | 6/1999 | Messner |
| 5,930,840 A | 8/1999 | Arai |
| 5,947,552 A | 9/1999 | Wilkins et al. |
| 5,951,102 A | 9/1999 | Poulson et al. |
| 5,956,777 A | 9/1999 | Popovich |
| 5,961,180 A | 10/1999 | Greger et al. |
| 5,979,982 A | 11/1999 | Nakagawa |
| 5,997,086 A | 12/1999 | Gibson et al. |
| 5,997,098 A | 12/1999 | Coffeen |
| 6,017,088 A * | 1/2000 | Stephens ............... A47D 13/02 292/50 |
| 6,027,163 A | 2/2000 | Longenecker |
| 6,032,297 A | 3/2000 | Barthold et al. |
| 6,042,181 A * | 3/2000 | Goor .................... B60N 2/2806 297/216.11 |
| 6,048,028 A | 4/2000 | Bapst |
| 6,059,369 A | 5/2000 | Bateson et al. |
| 6,070,890 A | 6/2000 | Haut et al. |
| 6,079,780 A | 6/2000 | Bapst |
| 6,082,814 A | 7/2000 | Celestina-Krevh et al. |
| 6,109,689 A | 8/2000 | Nanni |
| 6,139,101 A | 10/2000 | Berringer et al. |
| 6,155,638 A | 12/2000 | Bapst |
| 6,161,847 A | 12/2000 | Howell et al. |
| 6,170,910 B1 | 1/2001 | Bapst |
| 6,209,957 B1 | 4/2001 | Baloga |
| 6,272,692 B1 | 8/2001 | Abraham |
| 6,296,259 B1 | 10/2001 | Anderson |
| 6,319,138 B1 | 11/2001 | Fair et al. |
| 6,322,140 B1 | 11/2001 | Jessup et al. |
| 6,325,454 B1 | 12/2001 | Maier |
| 6,331,032 B1 | 12/2001 | Haut et al. |
| 6,367,875 B1 | 4/2002 | Bapst |
| 6,389,607 B1 | 5/2002 | Wood |
| 6,409,205 B1 | 6/2002 | Bapst et al. |
| 6,421,840 B1 | 7/2002 | Chen et al. |
| 6,428,099 B1 | 8/2002 | Kain |
| 6,431,647 B2 | 8/2002 | Yamazaki |
| 6,450,576 B1 | 9/2002 | Rhein et al. |
| 6,457,774 B2 | 10/2002 | Baloga |
| 6,471,298 B2 | 10/2002 | Carine et al. |
| 6,474,735 B1 | 11/2002 | Carnahan et al. |
| 6,513,827 B1 | 2/2003 | Barenbrug |
| 6,540,292 B2 | 4/2003 | Darling et al. |
| 6,540,579 B1 | 4/2003 | Gubitosi et al. |
| 6,561,915 B2 | 5/2003 | Kelly et al. |
| 6,623,074 B2 | 9/2003 | Asbach et al. |
| 6,626,489 B2 | 9/2003 | Geis et al. |
| 6,629,727 B2 | 10/2003 | Asbach et al. |
| 6,634,708 B2 | 10/2003 | Guenther |
| 6,666,505 B2 | 12/2003 | Greger et al. |
| 6,669,302 B2 | 12/2003 | Warner, Jr. et al. |
| 6,679,550 B2 | 1/2004 | Goor et al. |
| 6,695,412 B2 | 2/2004 | Barger et al. |
| 6,705,675 B1 | 3/2004 | Eastman et al. |
| 6,705,676 B1 | 3/2004 | Berringer et al. |
| 6,709,062 B2 | 3/2004 | Shah |
| 6,746,080 B2 | 6/2004 | Tsugimatsu et al. |
| 6,749,258 B1 | 6/2004 | Leikin |
| 6,764,133 B2 | 7/2004 | Osato |
| 6,796,610 B2 | 9/2004 | Nakagawa et al. |
| 6,811,217 B2 | 11/2004 | Kane et al. |
| 6,820,310 B2 | 11/2004 | Woodard et al. |
| 6,846,012 B2 | 1/2005 | Baskin et al. |
| 6,857,965 B2 | 2/2005 | Pook et al. |
| 6,877,801 B2 | 4/2005 | Asbach et al. |
| 6,877,802 B2 | 4/2005 | Christensen et al. |
| 6,877,809 B2 | 4/2005 | Yamazaki et al. |
| 6,887,161 B2 | 5/2005 | Mahlstedt et al. |
| 6,896,575 B2 | 5/2005 | Fair et al. |
| 6,912,736 B2 | 7/2005 | Moeller et al. |
| 6,922,147 B1 | 7/2005 | Viksins et al. |
| 6,926,359 B2 | 8/2005 | Runk |
| 6,931,671 B2 | 8/2005 | Skiba |
| 6,932,709 B1 | 8/2005 | Gubitosi et al. |
| 6,947,071 B2 | 9/2005 | Eichmann |
| 6,979,057 B2 | 12/2005 | Sedlack |
| 7,017,921 B2 | 3/2006 | Eros |
| 7,044,548 B2 | 5/2006 | Mullen et al. |
| 7,044,549 B2 | 5/2006 | Maier et al. |
| 7,062,795 B2 | 6/2006 | Skiba et al. |
| 7,066,536 B2 | 6/2006 | Williams et al. |
| 7,188,897 B2 | 3/2007 | Patrizi et al. |
| 7,195,314 B2 | 3/2007 | Spence et al. |
| 7,201,444 B2 | 4/2007 | Schimmoller et al. |
| 7,207,628 B2 | 4/2007 | Eros |
| 7,234,771 B2 | 6/2007 | Nakhla |
| 7,244,165 B2 | 7/2007 | Gubitosi et al. |
| 7,246,855 B2 | 7/2007 | Langmaid et al. |
| 7,252,342 B2 | 8/2007 | Patrizi et al. |

(56) References Cited

U.S. PATENT DOCUMENTS

| | | | |
|---|---|---|---|
| 7,270,373 B2 | 9/2007 | Sakamoto | |
| 7,278,683 B2 | 10/2007 | Williams et al. | |
| 7,278,684 B2 | 10/2007 | Boyle | |
| 7,322,648 B2 | 1/2008 | Nakagawa | |
| 7,325,871 B2 * | 2/2008 | Gangadharan | B60N 2/2806 297/256.13 |
| 7,325,872 B2 | 2/2008 | Basu et al. | |
| 7,328,462 B1 | 2/2008 | Straus | |
| 7,328,941 B2 | 2/2008 | Asbach et al. | |
| 7,338,122 B2 | 3/2008 | Hei et al. | |
| 7,370,912 B2 | 5/2008 | Williams et al. | |
| 7,387,336 B2 | 6/2008 | Sakumoto | |
| 7,413,158 B1 | 8/2008 | Burer | |
| 7,438,644 B2 | 10/2008 | Gubitosi et al. | |
| 7,445,228 B2 | 11/2008 | Henry | |
| 7,445,559 B2 | 11/2008 | Kakuda | |
| 7,452,031 B2 | 11/2008 | Woellert et al. | |
| 7,455,353 B2 | 11/2008 | Favorito (nee Wilkins) et al. | |
| 7,467,824 B2 | 12/2008 | Nakhla et al. | |
| 7,472,952 B2 | 1/2009 | Nakhla et al. | |
| 7,472,955 B2 | 1/2009 | Crane et al. | |
| 7,484,801 B2 | 2/2009 | Kassai et al. | |
| 7,488,034 B2 | 2/2009 | Ohren et al. | |
| 7,497,449 B2 | 3/2009 | Logger | |
| 7,506,926 B2 | 3/2009 | Carine | |
| 7,523,984 B2 | 4/2009 | Steininger | |
| 7,536,731 B1 | 5/2009 | Feldman | |
| 7,552,969 B2 | 6/2009 | Maciejczyk | |
| 7,559,606 B2 | 7/2009 | Hei et al. | |
| 7,597,396 B2 | 10/2009 | Longenecker et al. | |
| 7,607,734 B2 | 10/2009 | Clapper et al. | |
| 7,648,199 B2 | 1/2010 | Amesar et al. | |
| RE41,121 E | 2/2010 | Asbach et al. | |
| 7,658,446 B2 * | 2/2010 | Meeker | B60N 2/2812 297/250.1 |
| 7,676,854 B2 | 3/2010 | Berger et al. | |
| 7,695,374 B2 | 4/2010 | Bellows et al. | |
| 7,717,506 B2 | 5/2010 | Amesar et al. | |
| 7,722,118 B2 | 5/2010 | Bapst et al. | |
| 7,726,734 B2 | 6/2010 | Mahal et al. | |
| 7,740,313 B1 | 6/2010 | Hei et al. | |
| 7,765,621 B2 | 8/2010 | Lardeau | |
| 7,765,622 B2 | 8/2010 | Wiles | |
| 7,770,970 B2 | 8/2010 | Hei et al. | |
| 7,770,971 B2 | 8/2010 | Bellows et al. | |
| 7,796,021 B2 | 9/2010 | Saban | |
| 7,798,500 B2 | 9/2010 | Den Boer | |
| 7,798,571 B2 | 9/2010 | Billman et al. | |
| 7,802,320 B2 | 9/2010 | Morgan | |
| 7,802,321 B2 | 9/2010 | Boyd | |
| 7,806,471 B2 | 10/2010 | Nishimoto | |
| 7,806,472 B2 | 10/2010 | Runk et al. | |
| 7,810,682 B2 * | 10/2010 | Balensiefer | A47D 13/02 224/158 |
| 7,832,023 B2 | 11/2010 | Crisco | |
| 7,837,275 B2 | 11/2010 | Woellert et al. | |
| 7,841,657 B2 | 11/2010 | Nishimoto et al. | |
| 7,871,125 B2 | 1/2011 | Asbach et al. | |
| 7,887,129 B2 | 2/2011 | Hei et al. | |
| 7,891,732 B2 | 2/2011 | Hei et al. | |
| 7,930,771 B2 | 4/2011 | Depreitere et al. | |
| 7,938,731 B2 | 5/2011 | Papageorge et al. | |
| 7,954,895 B2 | 6/2011 | Freeman et al. | |
| 7,967,376 B2 | 6/2011 | Przybylo et al. | |
| 7,987,525 B2 | 8/2011 | Summers et al. | |
| 8,016,676 B2 | 9/2011 | Carter | |
| 8,020,220 B2 | 9/2011 | McElroy et al. | |
| 8,029,014 B2 | 10/2011 | Ahnert et al. | |
| 8,047,608 B2 | 11/2011 | Damiani et al. | |
| 8,056,975 B2 | 11/2011 | Longenecker et al. | |
| 8,070,226 B2 | 12/2011 | Dingier et al. | |
| 8,070,227 B2 | 12/2011 | Brunick et al. | |
| 8,087,680 B2 | 1/2012 | Dotsey et al. | |
| 8,087,723 B2 | 1/2012 | Honnorat et al. | |
| 8,147,345 B2 | 4/2012 | Furman | |
| 8,166,573 B1 | 5/2012 | Chung et al. | |
| 8,182,033 B2 | 5/2012 | Hei et al. | |
| 8,182,355 B2 | 5/2012 | Bapst | |
| 8,197,005 B2 | 6/2012 | Hopke et al. | |
| 8,205,940 B2 | 6/2012 | Mahal et al. | |
| 8,209,784 B2 | 7/2012 | Nimmons et al. | |
| 8,210,610 B2 | 7/2012 | Berkey et al. | |
| 8,235,461 B2 | 8/2012 | Cohen | |
| 8,235,465 B2 | 8/2012 | Hei et al. | |
| 8,240,772 B2 * | 8/2012 | Kawata | B60N 2/2812 297/219.12 |
| 8,256,840 B2 | 9/2012 | Dasent et al. | |
| 8,256,841 B2 | 9/2012 | Hei et al. | |
| 8,286,990 B2 | 10/2012 | Tanizaki et al. | |
| 8,297,694 B2 | 10/2012 | Arnold, IV et al. | |
| 8,308,239 B2 | 11/2012 | Lundeen | |
| 8,348,337 B2 | 1/2013 | Franck et al. | |
| 8,388,058 B2 | 3/2013 | Krasley | |
| 8,393,679 B2 | 3/2013 | Longenecker et al. | |
| 8,408,656 B2 | 4/2013 | Carpenter | |
| 8,419,129 B2 | 4/2013 | Inoue et al. | |
| 8,424,964 B2 | 4/2013 | Campbell et al. | |
| 8,430,452 B2 | 4/2013 | Brunick et al. | |
| 8,434,827 B2 | 5/2013 | Young et al. | |
| 8,449,030 B2 | 5/2013 | Powell et al. | |
| 8,459,739 B2 | 6/2013 | Tamanouchi et al. | |
| 8,474,907 B2 * | 7/2013 | Weber | B60N 2/2821 297/256.13 |
| 8,491,401 B2 | 7/2013 | Szymanski | |
| 8,500,196 B2 | 8/2013 | Strong et al. | |
| 8,511,749 B2 | 8/2013 | Hei et al. | |
| 8,534,751 B2 | 9/2013 | Hei et al. | |
| 8,540,312 B2 | 9/2013 | Asbach et al. | |
| 8,550,556 B2 | 10/2013 | Asbach | |
| 8,556,349 B2 | 10/2013 | Welch et al. | |
| 8,579,091 B2 | 11/2013 | Ruthinowski et al. | |
| 8,622,478 B2 | 1/2014 | Spence | |
| 8,632,127 B2 | 1/2014 | Brunick et al. | |
| 8,640,267 B1 | 2/2014 | Cohen | |
| 8,659,414 B1 | 2/2014 | Schuk | |
| 8,684,456 B2 | 4/2014 | Powell | |
| 8,690,237 B2 | 4/2014 | Allen | |
| 8,746,793 B2 | 6/2014 | Powell et al. | |
| 8,768,292 B2 | 7/2014 | Welch | |
| 8,864,229 B2 | 10/2014 | Rajasingham | |
| 8,911,015 B2 | 12/2014 | Cohen et al. | |
| 8,926,014 B2 | 1/2015 | Su | |
| 8,960,789 B2 | 2/2015 | McCormick et al. | |
| 8,960,794 B2 * | 2/2015 | St. Pierre | A47D 13/02 297/219.12 |
| 8,991,935 B2 * | 3/2015 | Balensiefer, II | B60N 2/2812 297/216.11 |
| 9,016,781 B2 | 4/2015 | Cheng et al. | |
| 9,061,609 B2 | 6/2015 | Hou et al. | |
| 9,085,250 B2 | 7/2015 | Cheng et al. | |
| 9,089,180 B2 * | 7/2015 | Phipps | A42B 3/12 |
| 9,102,249 B2 | 8/2015 | Mo | |
| 9,189,943 B1 | 11/2015 | Rambadt et al. | |
| 9,211,820 B2 | 12/2015 | Allen et al. | |
| 9,388,873 B1 | 7/2016 | Phipps et al. | |
| 9,388,875 B2 | 7/2016 | Hagelin et al. | |
| 9,434,279 B2 | 9/2016 | Williams | |
| 9,527,413 B1 | 12/2016 | Thyagarajan et al. | |
| 9,616,782 B2 | 4/2017 | Cohen et al. | |
| 9,682,642 B2 | 6/2017 | Fujita et al. | |
| 9,685,063 B2 | 6/2017 | Cohen et al. | |
| 10,150,389 B2 | 12/2018 | Cohen et al. | |
| 10,220,734 B2 | 3/2019 | Cohen et al. | |
| 2001/0032351 A1 | 10/2001 | Nakayama et al. | |
| 2002/0000743 A1 * | 1/2002 | Mori | B60N 2/2812 297/216.11 |
| 2002/0043830 A1 * | 4/2002 | Sawamoto | B60N 2/2809 297/216.11 |
| 2002/0043836 A1 | 4/2002 | Maciejczyk et al. | |
| 2003/0062996 A1 | 4/2003 | Flannagan et al. | |
| 2003/0122662 A1 | 7/2003 | Quinonez | |
| 2003/0222775 A1 | 12/2003 | Rackham | |
| 2004/0164529 A1 | 8/2004 | Yoshida | |
| 2004/0169406 A1 | 9/2004 | Yoshida | |

(56) References Cited

U.S. PATENT DOCUMENTS

| | | | |
|---|---|---|---|
| 2004/0232747 A1* | 11/2004 | Yamazaki | B60N 2/2806 297/250.1 |
| 2004/0250339 A1 | 12/2004 | Musal | |
| 2004/0255370 A1 | 12/2004 | Moeller | |
| 2005/0030188 A1 | 2/2005 | Flannagan | |
| 2005/0200465 A1 | 9/2005 | Fabors et al. | |
| 2005/0278834 A1 | 12/2005 | Lee | |
| 2006/0059605 A1 | 3/2006 | Ferrara | |
| 2006/0059606 A1 | 3/2006 | Ferrara | |
| 2006/0162053 A1 | 7/2006 | Lee | |
| 2006/0163921 A1 | 7/2006 | Macliver | |
| 2006/0242752 A1 | 11/2006 | Talluri | |
| 2006/0267386 A1* | 11/2006 | Nakhla | B29C 44/1271 297/250.1 |
| 2006/0277664 A1 | 12/2006 | Akhtar | |
| 2007/0040428 A1 | 2/2007 | Sakumoto | |
| 2007/0046086 A1 | 3/2007 | Sakumoto | |
| 2007/0068282 A1 | 3/2007 | Nakagawa et al. | |
| 2007/0080568 A1 | 4/2007 | Nakagawa et al. | |
| 2007/0107112 A1 | 5/2007 | Boyd | |
| 2007/0119538 A1 | 5/2007 | Price | |
| 2007/0130673 A1 | 6/2007 | Wasserkrug | |
| 2007/0157370 A1 | 7/2007 | Joubert Des Ouches | |
| 2007/0226881 A1 | 10/2007 | Reinhard et al. | |
| 2007/0284924 A1 | 12/2007 | Gold et al. | |
| 2007/0296252 A1 | 12/2007 | Mattes et al. | |
| 2008/0054692 A1 | 3/2008 | Lhomme et al. | |
| 2008/0222782 A1 | 9/2008 | Stokes | |
| 2009/0026815 A1 | 1/2009 | Amesar et al. | |
| 2009/0102253 A1 | 4/2009 | Forbes | |
| 2009/0222964 A1 | 9/2009 | Wiles | |
| 2009/0241305 A1 | 10/2009 | Buckingham | |
| 2009/0256406 A1 | 10/2009 | Schrooten | |
| 2009/0315299 A1 | 12/2009 | Barenbrug | |
| 2010/0033000 A1 | 2/2010 | Singh | |
| 2010/0060046 A1 | 3/2010 | Vertegaal | |
| 2010/0171348 A1* | 7/2010 | Rajasingham | B60N 2/2209 297/216.1 |
| 2010/0295347 A1* | 11/2010 | Marsden | B60N 2/2851 297/216.11 |
| 2011/0018320 A1 | 1/2011 | Schneider et al. | |
| 2011/0047678 A1 | 3/2011 | Barth et al. | |
| 2011/0074195 A1 | 3/2011 | Hei et al. | |
| 2011/0089728 A1 | 4/2011 | Wuerstl | |
| 2011/0107503 A1 | 5/2011 | Morgan | |
| 2011/0179557 A1 | 7/2011 | Rabie | |
| 2011/0203024 A1 | 8/2011 | Morgan | |
| 2011/0227376 A1 | 9/2011 | Franck et al. | |
| 2011/0227383 A1 | 9/2011 | Strong | |
| 2011/0233975 A1 | 9/2011 | Mindel et al. | |
| 2011/0241391 A1 | 10/2011 | Lamparter et al. | |
| 2011/0272925 A1 | 11/2011 | Dijkstra | |
| 2011/0304178 A1 | 12/2011 | Rajasingham | |
| 2012/0013157 A1* | 1/2012 | Keegan | B60N 2/2845 297/250.1 |
| 2012/0060251 A1 | 3/2012 | Schimpf | |
| 2012/0151663 A1 | 6/2012 | Rumbaugh | |
| 2012/0186002 A1 | 7/2012 | Bhatnagar et al. | |
| 2012/0216339 A1 | 8/2012 | Nimmons et al. | |
| 2012/0232749 A1 | 9/2012 | Schoenberg et al. | |
| 2012/0233745 A1 | 9/2012 | Veazie | |
| 2012/0267925 A1 | 10/2012 | Hei et al. | |
| 2013/0015690 A1 | 1/2013 | Mendis et al. | |
| 2013/0033373 A1 | 2/2013 | Thomas | |
| 2013/0049955 A1 | 2/2013 | Hoover et al. | |
| 2013/0088057 A1 | 4/2013 | Szakelyhidi et al. | |
| 2013/0093227 A1 | 4/2013 | Mendes et al. | |
| 2013/0125294 A1 | 5/2013 | Ferrara | |
| 2013/0185837 A1 | 7/2013 | Phipps | |
| 2013/0340147 A1 | 12/2013 | Giles | |
| 2014/0070581 A1 | 3/2014 | Rabeony | |
| 2014/0184404 A1 | 7/2014 | Schoenberg et al. | |
| 2014/0216241 A1 | 8/2014 | Lamparter et al. | |
| 2014/0253314 A1 | 9/2014 | Rambadt et al. | |
| 2014/0306838 A1 | 10/2014 | Beumler | |
| 2014/0354021 A1 | 12/2014 | Sedlack | |
| 2015/0130218 A1 | 5/2015 | Levin | |
| 2015/0175035 A1 | 6/2015 | Balensiefer, II et al. | |
| 2015/0242820 A1 | 8/2015 | Oz | |
| 2015/0251567 A1 | 9/2015 | Cohen et al. | |
| 2015/0300785 A1 | 10/2015 | Lamparter et al. | |
| 2015/0336481 A1 | 11/2015 | Horsfall | |
| 2016/0042624 A1 | 2/2016 | Quave | |
| 2016/0059744 A1 | 3/2016 | Cohen et al. | |
| 2016/0059748 A1 | 3/2016 | Cohen et al. | |
| 2016/0078737 A1 | 3/2016 | Cohen et al. | |
| 2016/0207427 A1 | 7/2016 | Wang | |
| 2016/0332542 A1 | 11/2016 | Cohen | |
| 2017/0320411 A1 | 11/2017 | Mani | |

FOREIGN PATENT DOCUMENTS

| | | |
|---|---|---|
| EP | 1110806 A1 | 6/2001 |
| EP | 1953035 | 8/2008 |
| EP | 2746097 | 6/2014 |
| ES | 2259854 | 10/2016 |
| FR | 3026686 | 4/2016 |
| JP | 1978076422 | 6/1978 |
| JP | 2002347486 | 4/2002 |
| JP | 2014-121974 A | 3/2014 |
| WO | WO2009/131123 A1 | 8/2011 |
| WO | WO2014/000014 | 1/2014 |

OTHER PUBLICATIONS

Children Injured in Motor Vehicle Traffic Crashes, NHTSA, May 2010, DOT HS 811 325.
U.S. Appl. No. 62/043,947, filed Aug. 29, 2014, Cohen et al.
U.S. Appl. No. 62/043,955, filed Aug. 29, 2014, Cohen et al.
U.S. Appl. No. 62/160,185, filed May 12, 2015, Cohen et al.
U.S. Appl. No. 62/569,090, filed Oct. 6, 2017, Cohen et al.
Helmets Preventing Concussion Seen Quashed by NFL-Riddell, John Helyar, Mar. 18, 2013, Bloomberg.
PCT International Search Report and Written Opinion of International Application No. PCT/US2014/020527 dated Jun. 24, 2014.
PCT International Search Report and Written Opinion of International Application No. PCT/US2015/049564 dated Jan. 15, 2016.
PCT International Search Report and Written Opinion of International Application No. PCT/US2016/031788 dated Sep. 19, 2016.
PCT International Search Report and Written Opinion of International Application No. PCT/US/18/54134 dated Feb. 14, 2019.
Supplementary Partial European Search Report of Application No. EP 14 76 0327 dated Oct. 6, 2016.
Supplementary European Search Report of Application No. EP 16 79 3413 dated Dec. 21, 2018.
Microfilm of JP Utility Model Appln. No. S57-23225 (JP S59-10661 U), Jan. 23, 1984, Shoji Futamura 7 Kazuhiro Matsui.
Examination Report 1 of Application No. AU2016262487 dated Aug. 14, 2019.

* cited by examiner

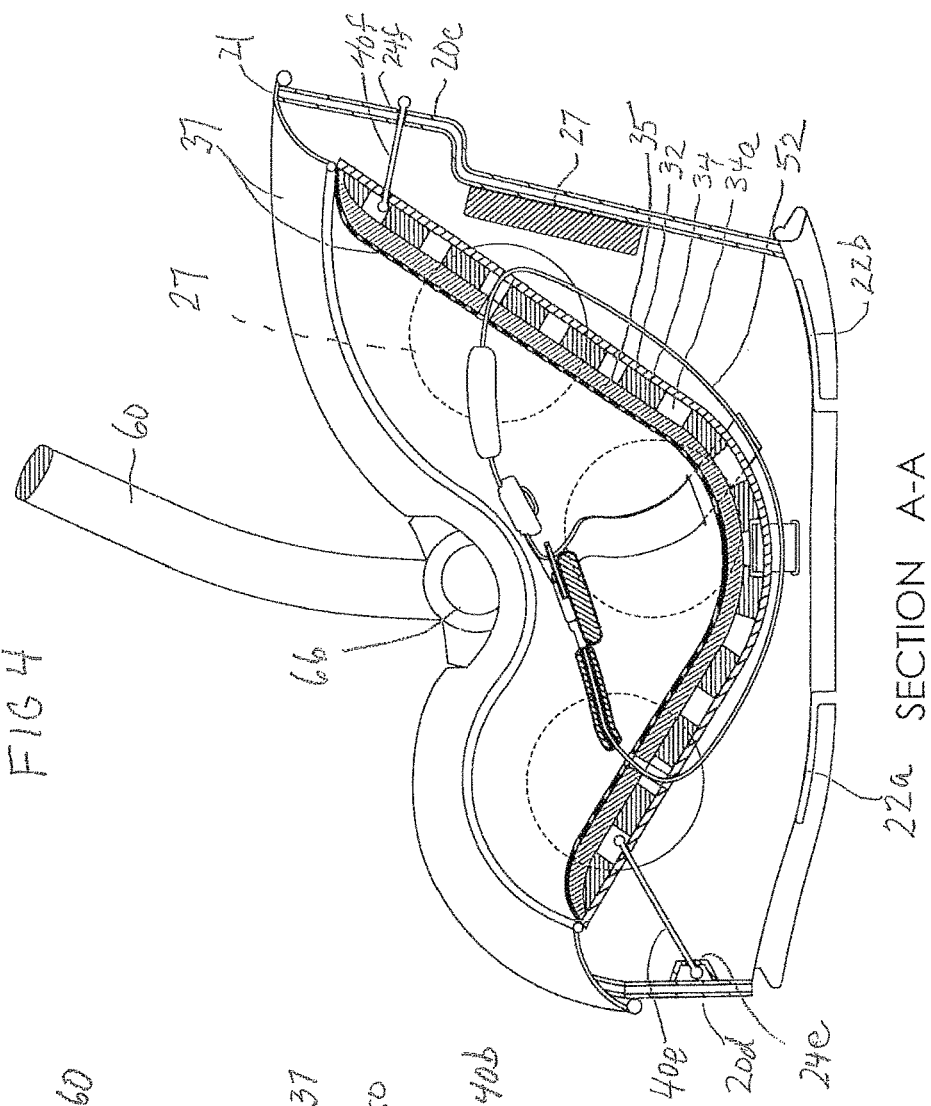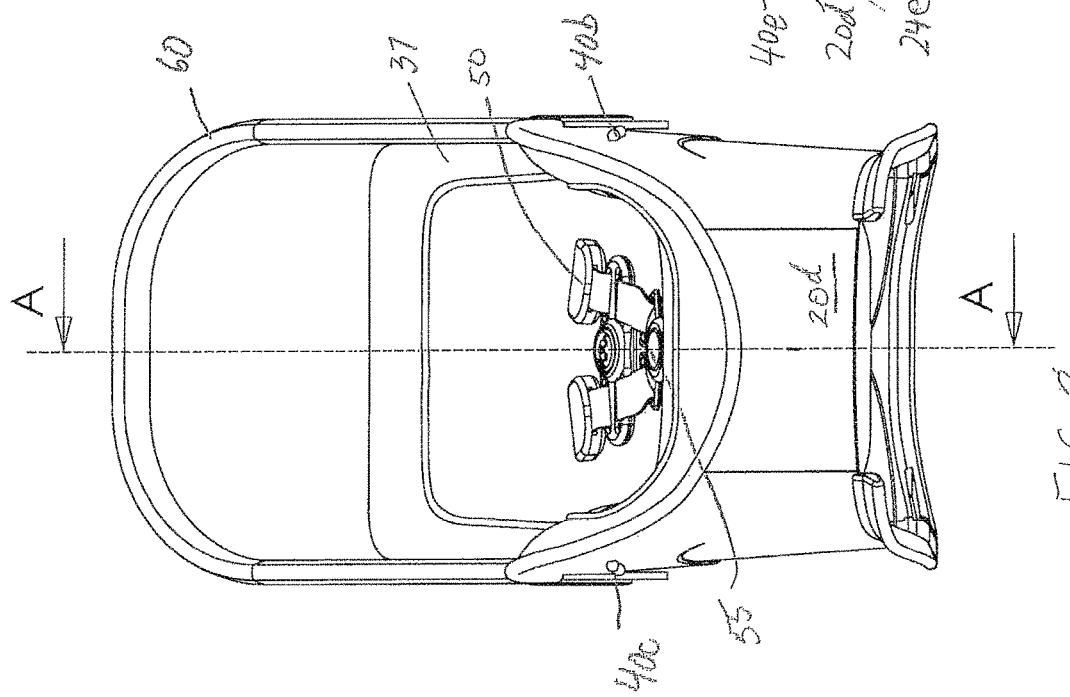

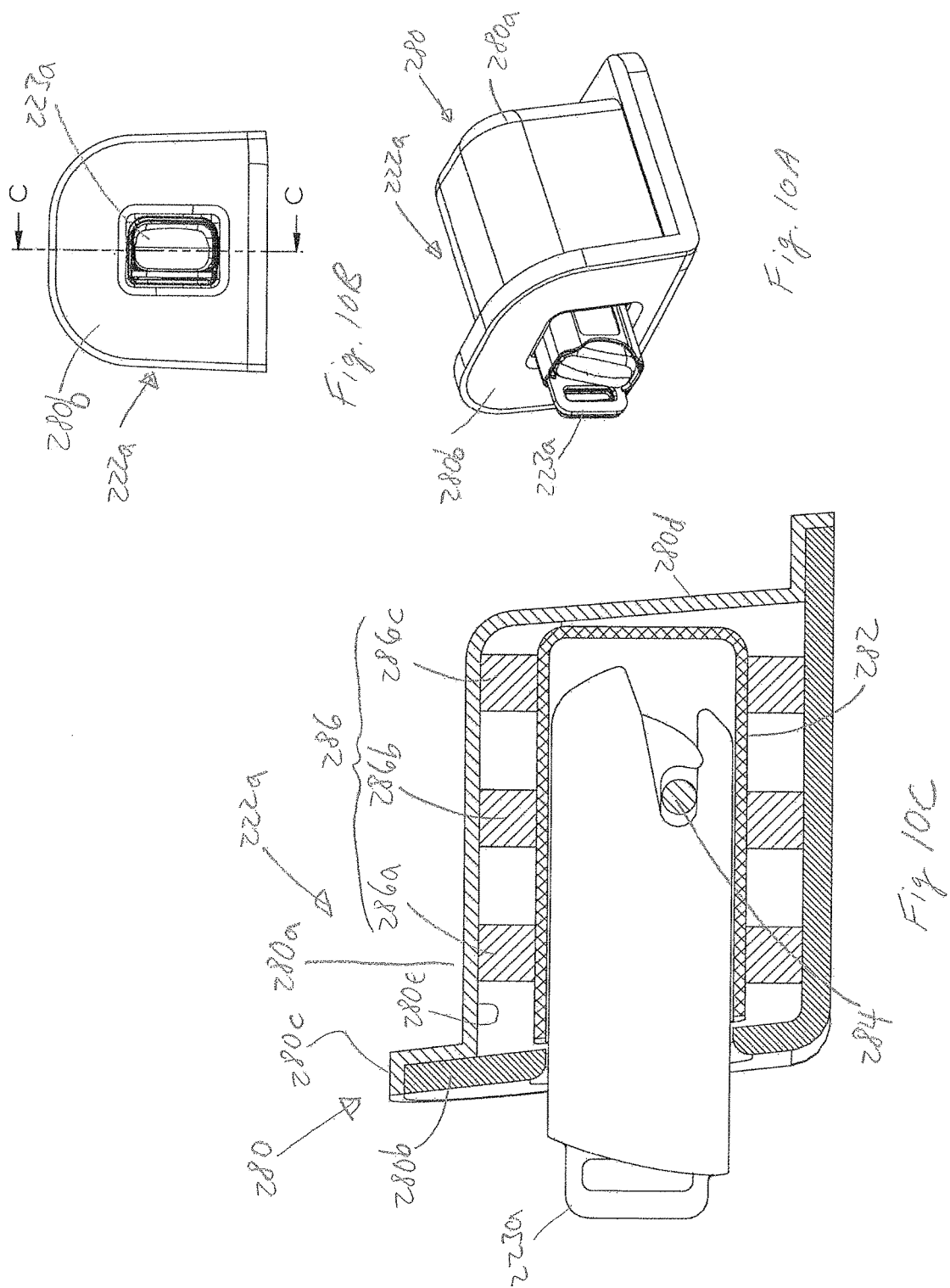

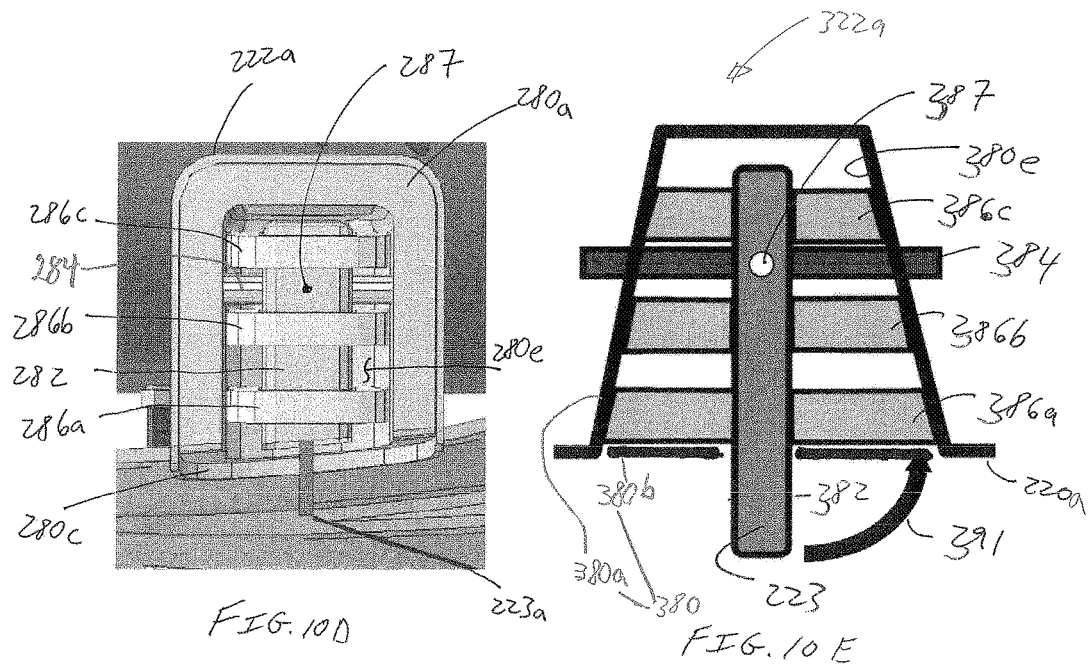

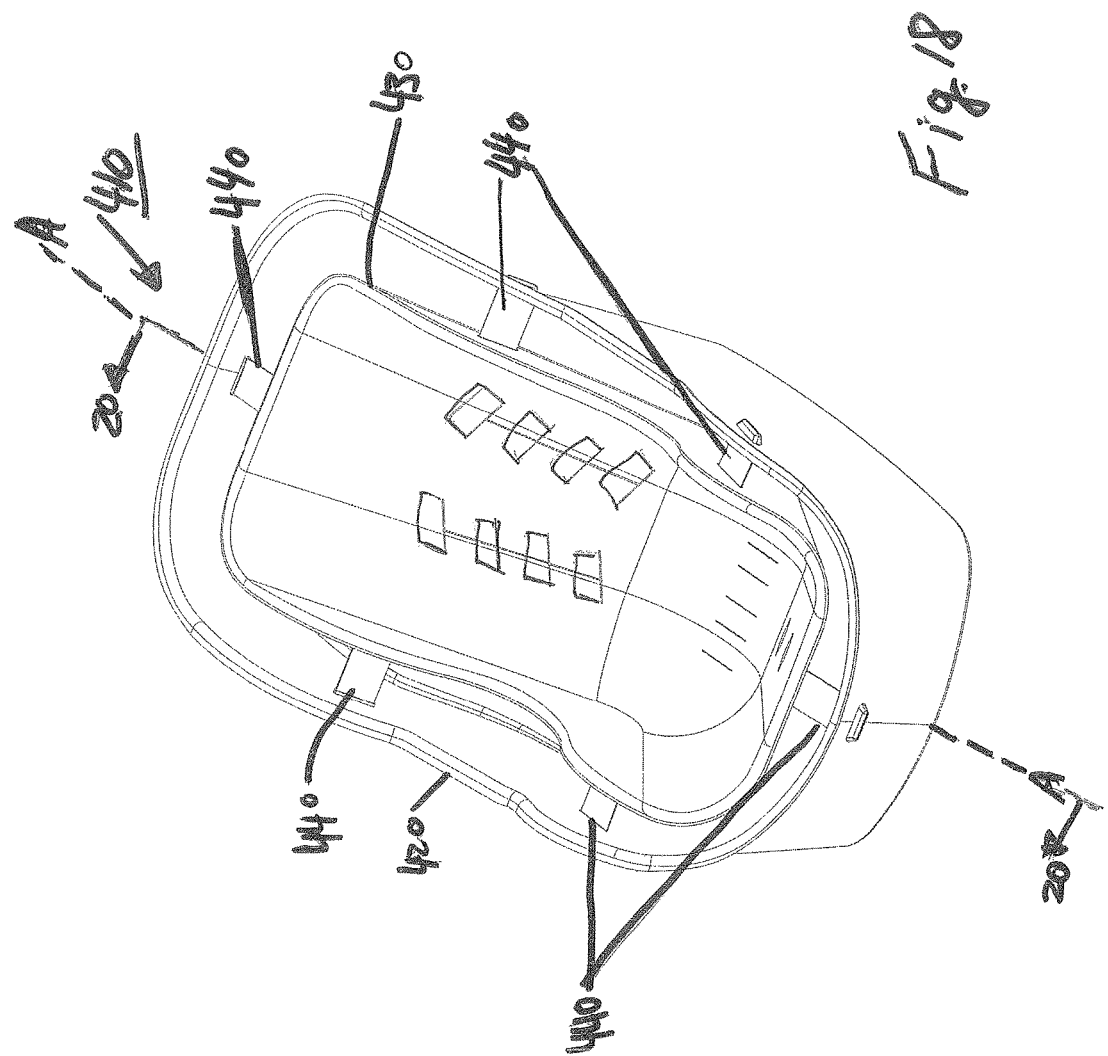

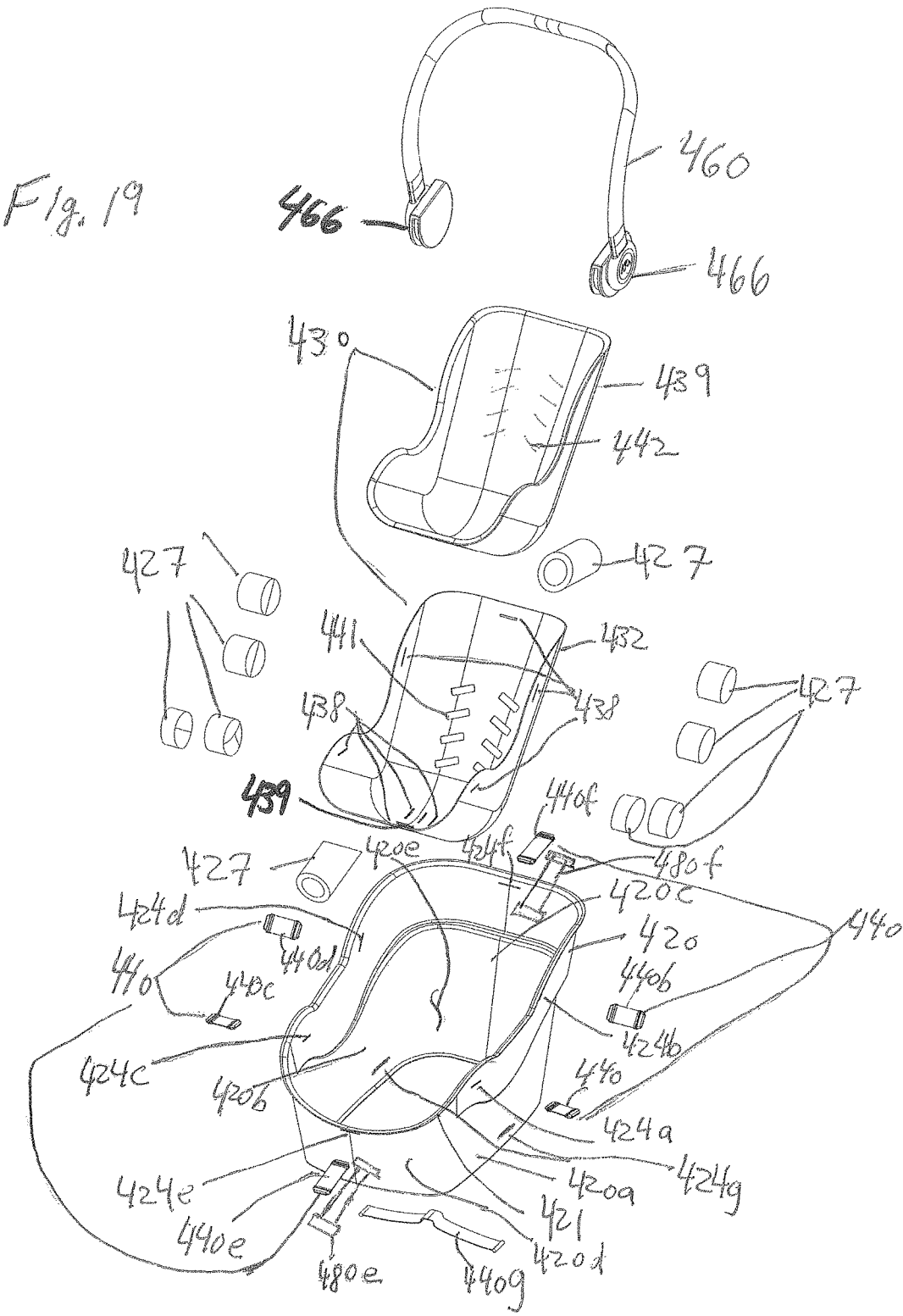

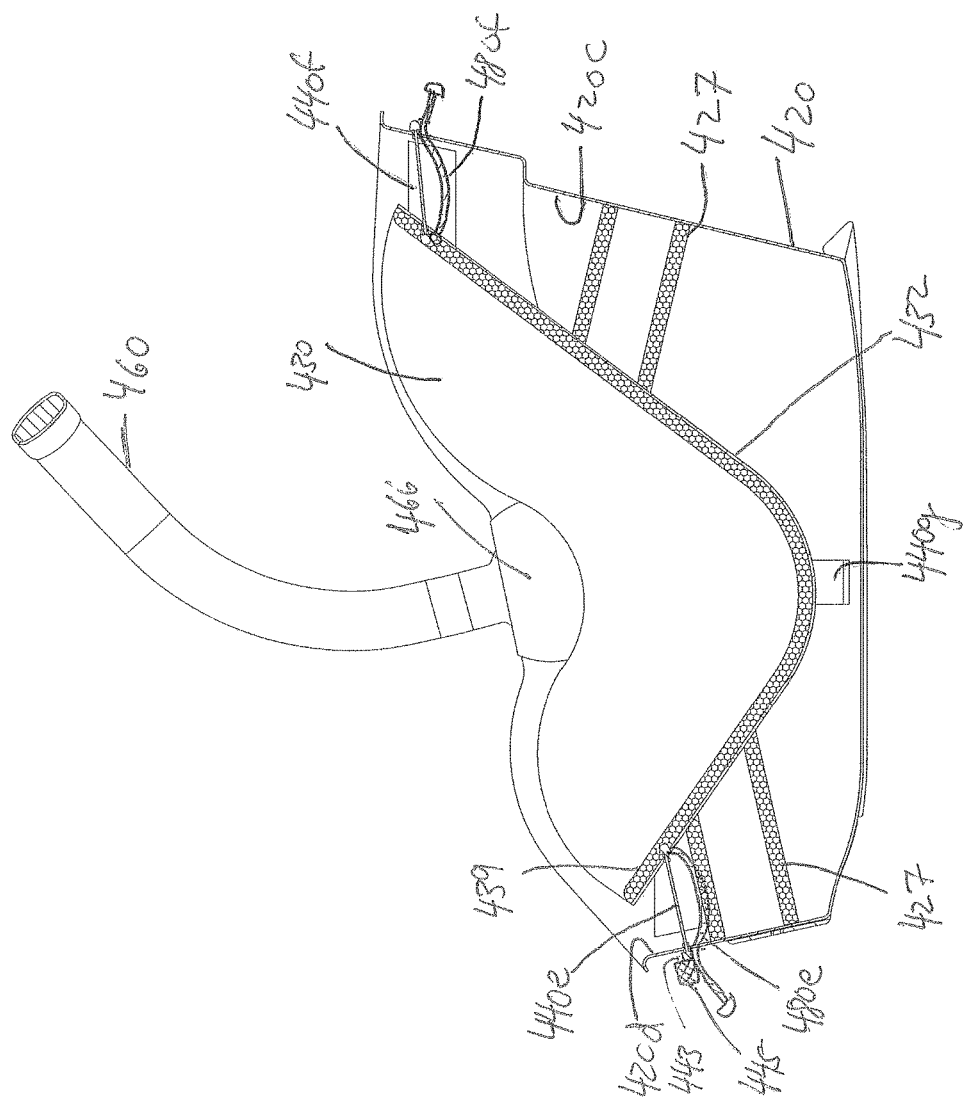

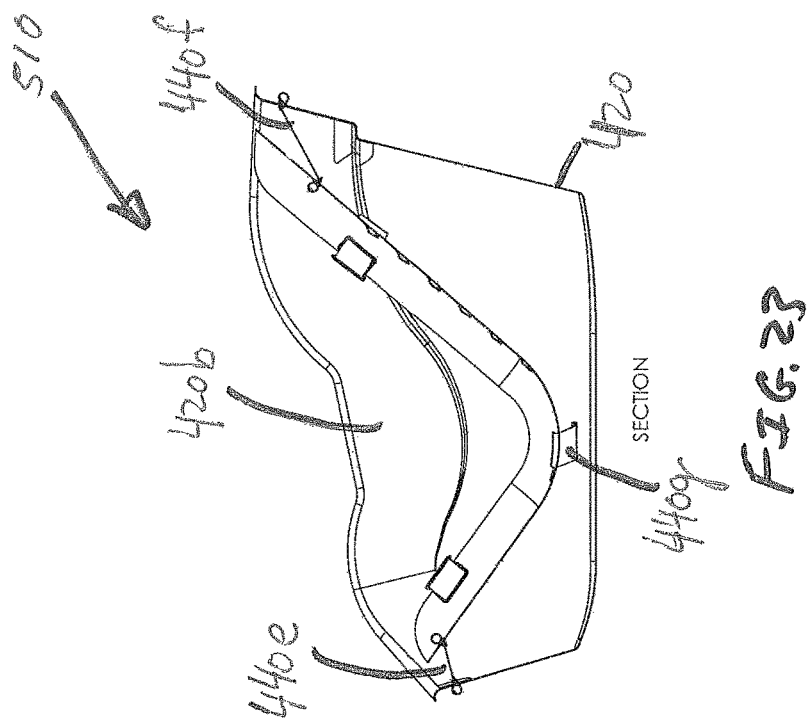
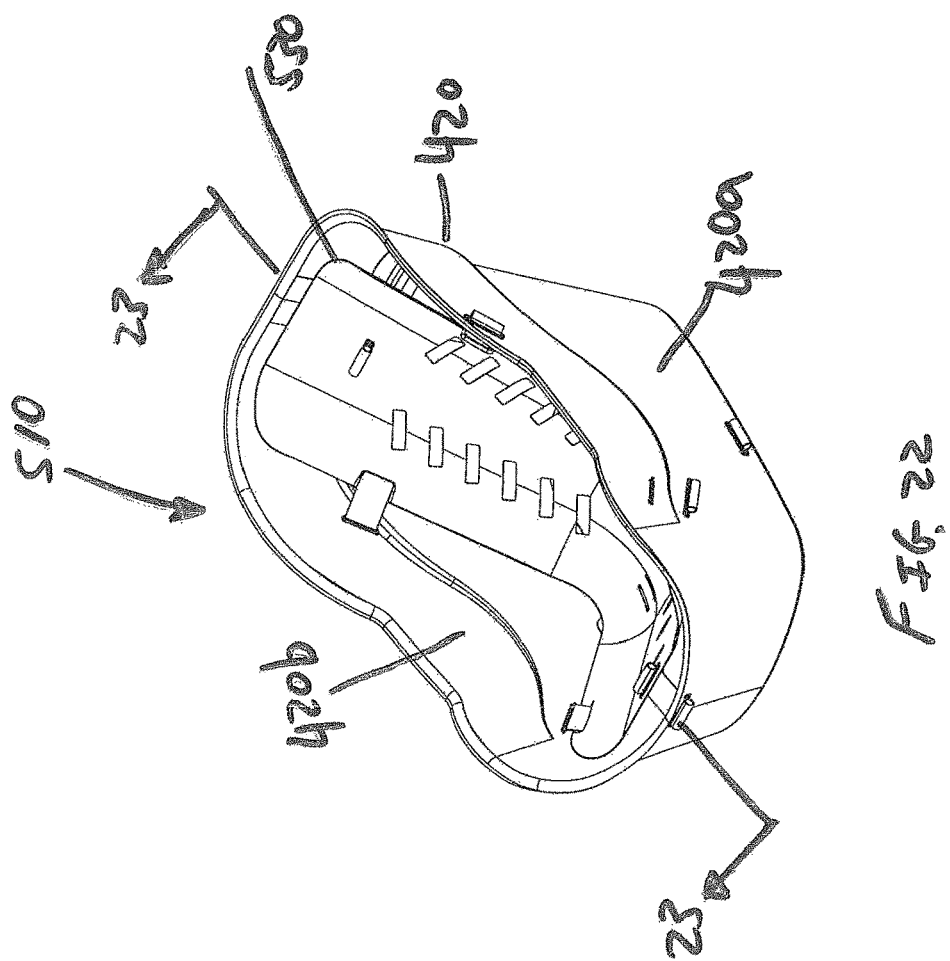

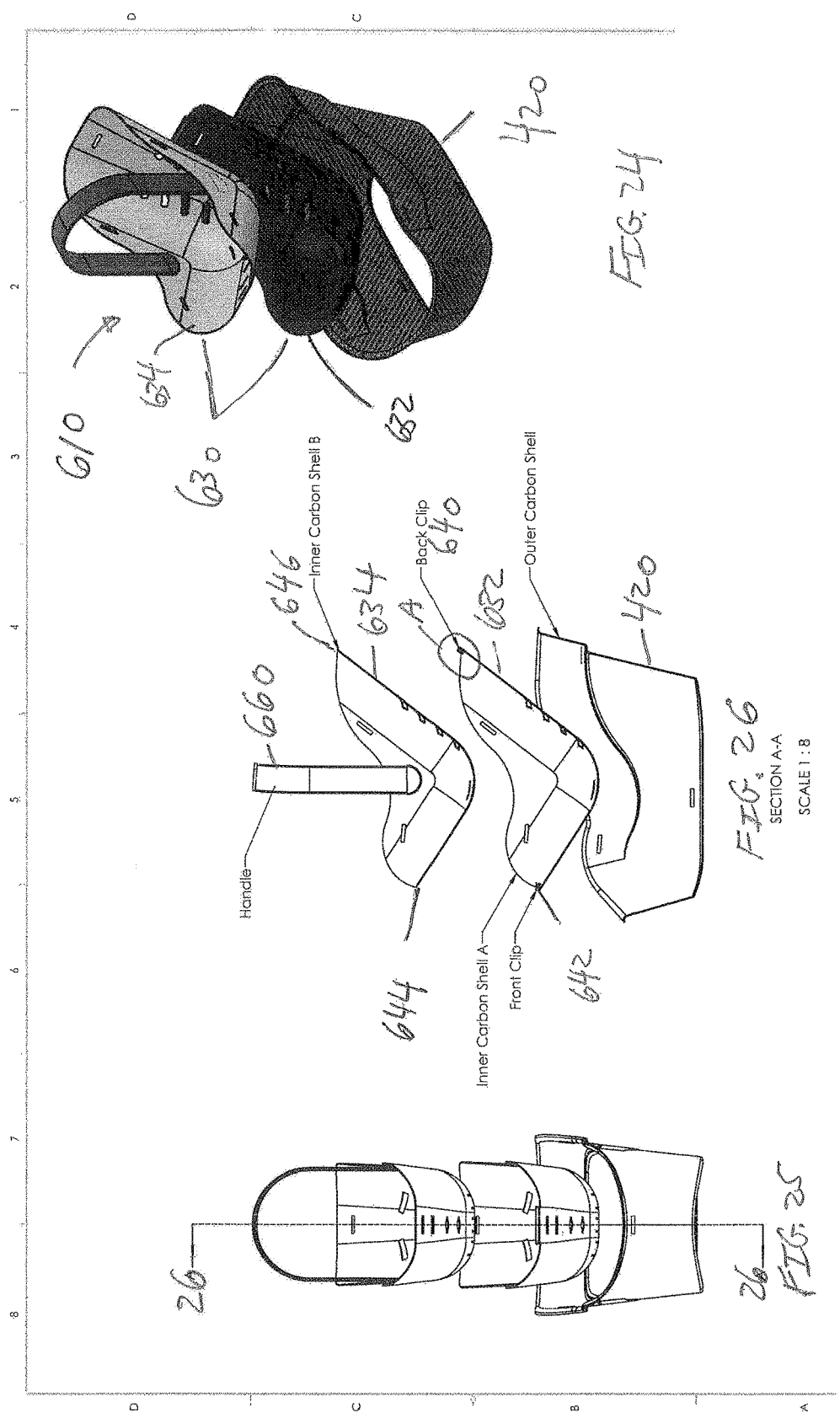

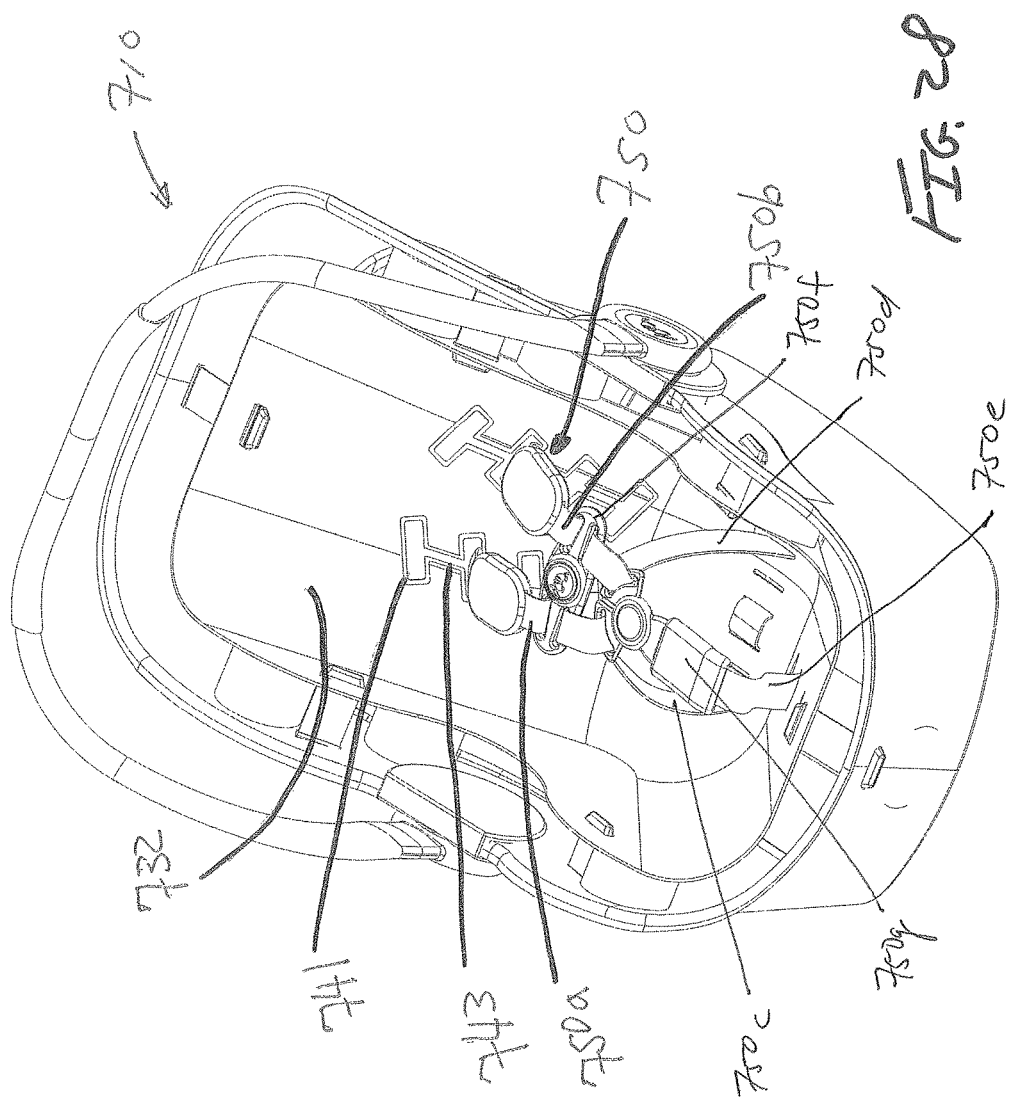

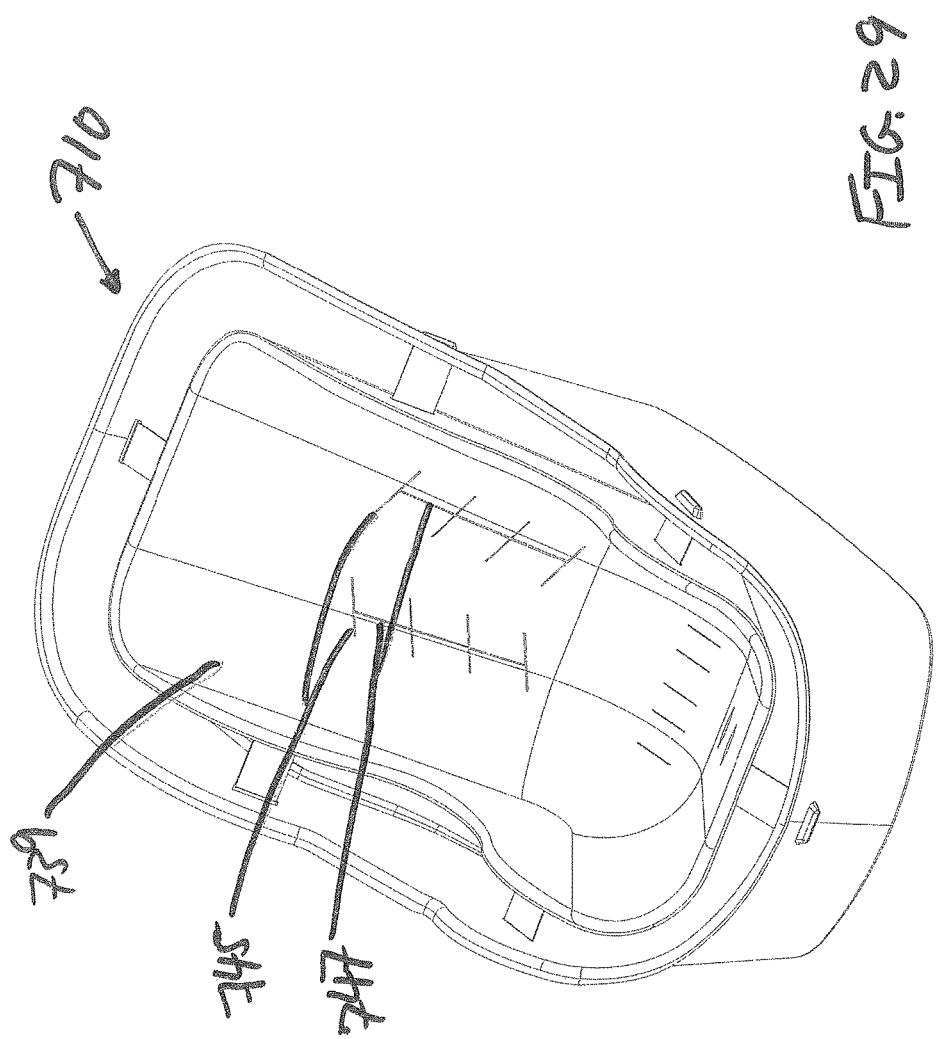

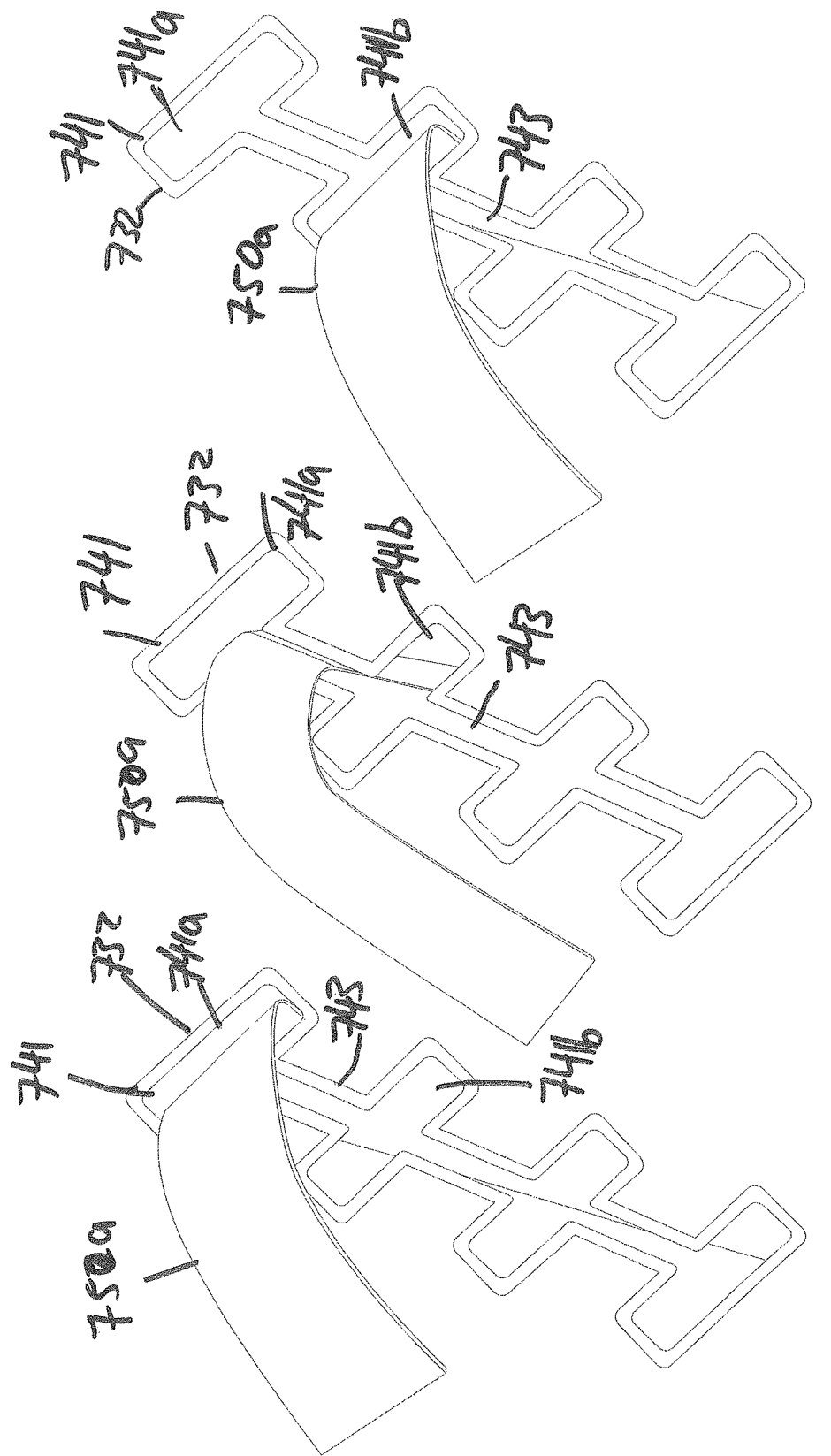

CAR SEAT

CROSS-REFERENCE TO RELATED APPLICATIONS

This application is a divisional of U.S. patent application Ser. No. 14/838,847 (Cohen et al. filed Aug. 28, 2015, which claims priority to U.S. Provisional Application No. 62/043,947 (Cohen et al.) filed Aug. 29, 2014, and which is also a continuation-in-part of U.S. patent application Ser. No. 14/197,855 (Cohen et al.) filed Mar. 5, 2014, now U.S. Pat. No. 9,487,110, issued Nov. 8, 2016, and which is also a continuation-in-part of International Patent Application No. PCT/US14/20527 (Cohen et al.) filed Mar. 5, 2014, which is a continuation-in-part of U.S. patent application Ser. No. 13/785,555 (Cohen et al.) filed Mar. 5, 2013, now U.S. Pat. No. 8,911,015, issued Dec. 16, 2014. The entire contents of each of the above-cited applications and patents are hereby incorporated herein by reference.

BACKGROUND

1. Field

The present disclosure relates to car seats. More particularly, the present disclosure relates to safety car seats. The safety car seats may be for infants or children, although this application is not limited thereto.

2. State of the Art

The most common cause of death for children aged 1-5 in developed countries is by accident, and the leading cause of death by accident is due to car accidents. When properly installed in passenger cars, child safety seats have been reported to reduce fatal injury by about 71% for children under age one and by about 54% for toddlers aged 1-4. Nonetheless, in the U.S. alone, over 250 children aged 0-4 are fatally injured every year while properly restrained in their car seats.

In addition, to the fatalities, every year, thousands of children who are properly restrained in car seats still sustain incapacitating injuries resulting from car accidents. By far the most common severe injuries are head injuries, including cerebrum injuries (contusions or lacerations), concussions, skull vault and skull base fractures, subarachnoid hemorrhages, and subdural hematomas. Other common severe injuries are thoracic (lung and rib), abdominal (bowel, liver, spleen, kidney), spine, and upper extremity (clavicle, humerus, radius/ulna) and lower extremity (pelvis, femur, tibia/fibula) injuries. The injury outcome in children can be worse than similar injuries sustained by adults, and children who suffer traumatic brain injuries can experience lasting or late-appearing neuropsychological problems. For example, frontal lobe functions develop relatively late in a child's growth, so that injury to the frontal lobes may not become apparent until the child reaches adolescence.

According to the U.S. National Highway Traffic and Safety Administration (NHTSA), children under the age of one should always ride in a rear-facing car seat that has a harness. While it is recommended that rear-facing seats be used as long as possible, it is recognized that children aged 1 and over will wish to face forward. NHTSA recommends that children aged 1-3 (and older if they have not reached a certain height and weight) use a forward-facing car seat with a harness and tether that limits the child's forward movement during a crash.

There are many types of car seats available for purchase. Infant seats recommended for children under age 1 are typically rear-facing. Many include a base that is belted or tethered into the car and a seat that can latch into the base. The seat often includes a handle so that the seat may be carried when it is unlatched from the base (i.e., from the car). A popular car seat option for infants as well as children is a "convertible" car seat that may be oriented in a rear-facing position and the "converted" to a front-facing position. Some convertible car seats may even convert into a booster seat for children weighing up to 100 pounds. Typically the convertible car seats are strapped into the car using the car seat-belt, or are anchored to the car frame directly using a LATCH (Lower anchors and Tethers for children) system. All car seats offer a harness for strapping the child into the seat. The usual harness is a five-point safety harness. The car seats tend to be formed from injection molded plastic, typically at least 5 mm thick, and the seats (with base in the case of the infant seats) typically weigh 7 kgs or more.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A car seat includes an outer protective shell, an inner seat, and a suspension system coupling and permitting relative movement between said inner seat and said outer protective shell, said suspension system suspending said inner seat substantially within said outer protective shell. The car seat further includes a plurality of padding elements. The outer protective shell has an inner surface and the plurality of padding elements are located on the inner surface of the outer protective shell. The plurality of padding elements extend from the inner surface of the outer protective shell to the inner seat and at least one of the padding elements always contacts the inner seat.

In another embodiment, a car seat includes an outer protective shell, an inner seat, and a suspension system coupling and permitting relative movement between the inner seat and the outer protective shell. The suspension system suspends the inner seat substantially within the outer protective shell. The suspension system includes a plurality of deformable webs connecting the inner seat to the outer protective shell.

The webs may be elastically and plastically deformable. In one embodiment, at least one of the webs is formed of woven fibers. As but one example, such a web is formed of woven fibers of polyethylene terephthalate (PET) and polyester partially oriented yarn (POY).

The car seat may also include one or more safety straps connected between the inner seat and the outer protective shell. The safety straps have an ultimate tensile load limit that is greater than each of the webs.

Preferably, at least one of the webs is constructed to plastically deform when the inner seat moves into contact with the outer protective shell.

In at least one embodiment, the inner seat is comprised of an inner shell layer and an outer shell layer removably coupled to the inner shell layer. A handle may extend from the inner shell layer or the outer protective shell.

BRIEF DESCRIPTION OF THE DRAWINGS

FIG. 3 is a front view of the car seat of FIG. 1.

FIG. 4 is a cross-sectional view of the car seat of FIG. 1 taken at A-A of FIG. 3.

FIG. 10A is a perspective view of an anchor box and tether connector shown in FIG. 7.

FIG. 10B is a side elevation view of the anchor box and tether connector shown in FIG. 10A.

FIG. 10C is a cross-sectional view of the anchor box and tether connector of FIG. 10A taken at C-C of FIG. 10B.

FIG. 10D is an elevation view of the anchor box and tether connector shown in FIG. 10A with a cover of the anchor box removed.

FIG. 10E is schematic representation of an alternate anchor box construction from that shown in FIG. 10D.

FIG. 18 is a perspective view of another embodiment of a car seat.

FIG. 19 is an exploded assembly view of the car seat shown in FIG. 18.

FIG. 20b is an alternate cross-sectional view of the car seat of FIG. 18 to that shown in FIG. 20a.

FIG. 22 is a perspective view of another embodiment of a car seat.

FIG. 23 is a cross-sectional view of car seat of FIG. 22 taken at 23-23 of FIG. 22.

FIG. 24 is an assembly view of another embodiment of a car seat.

FIG. 25 is a front elevation view of the assembly shown in FIG. 24.

FIG. 26 is a view of the assembly shown in FIG. 25 taken at 26-26 of FIG. 25.

FIG. 28 is an isometric view of another embodiment of a car seat shown without an inner shell layer.

FIG. 29 is a view of the car seat shown in FIG. 28 shown with an inner shell layer, but without a handle shown in FIG. 28.

FIG. 30a-30c shows an exploded view of an adjustment system of the car seat shown in FIG. 28.

DETAILED DESCRIPTION

Figure 1:
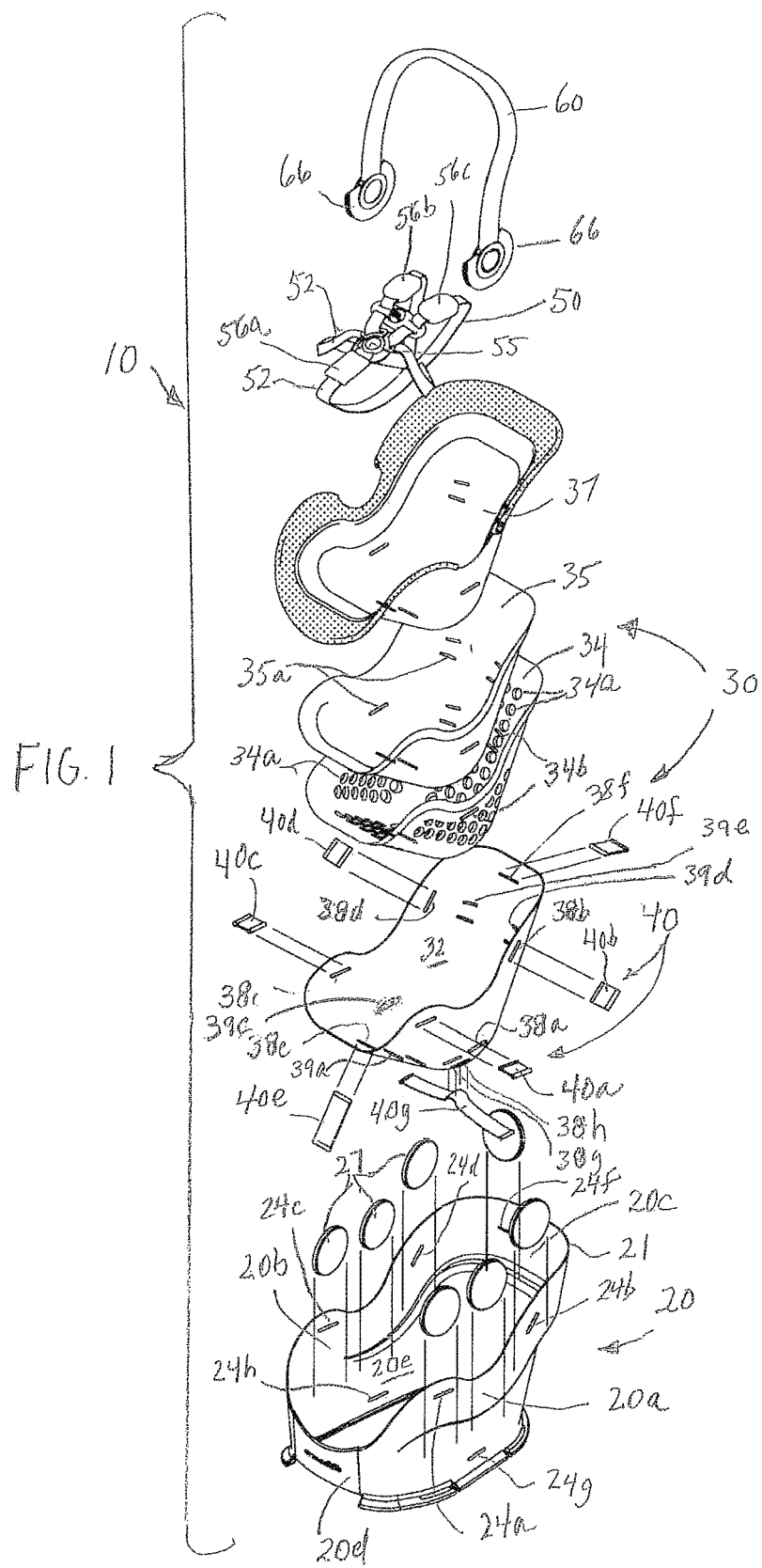
FIG. 1 is an exploded view of a car seat.
Figure 2:
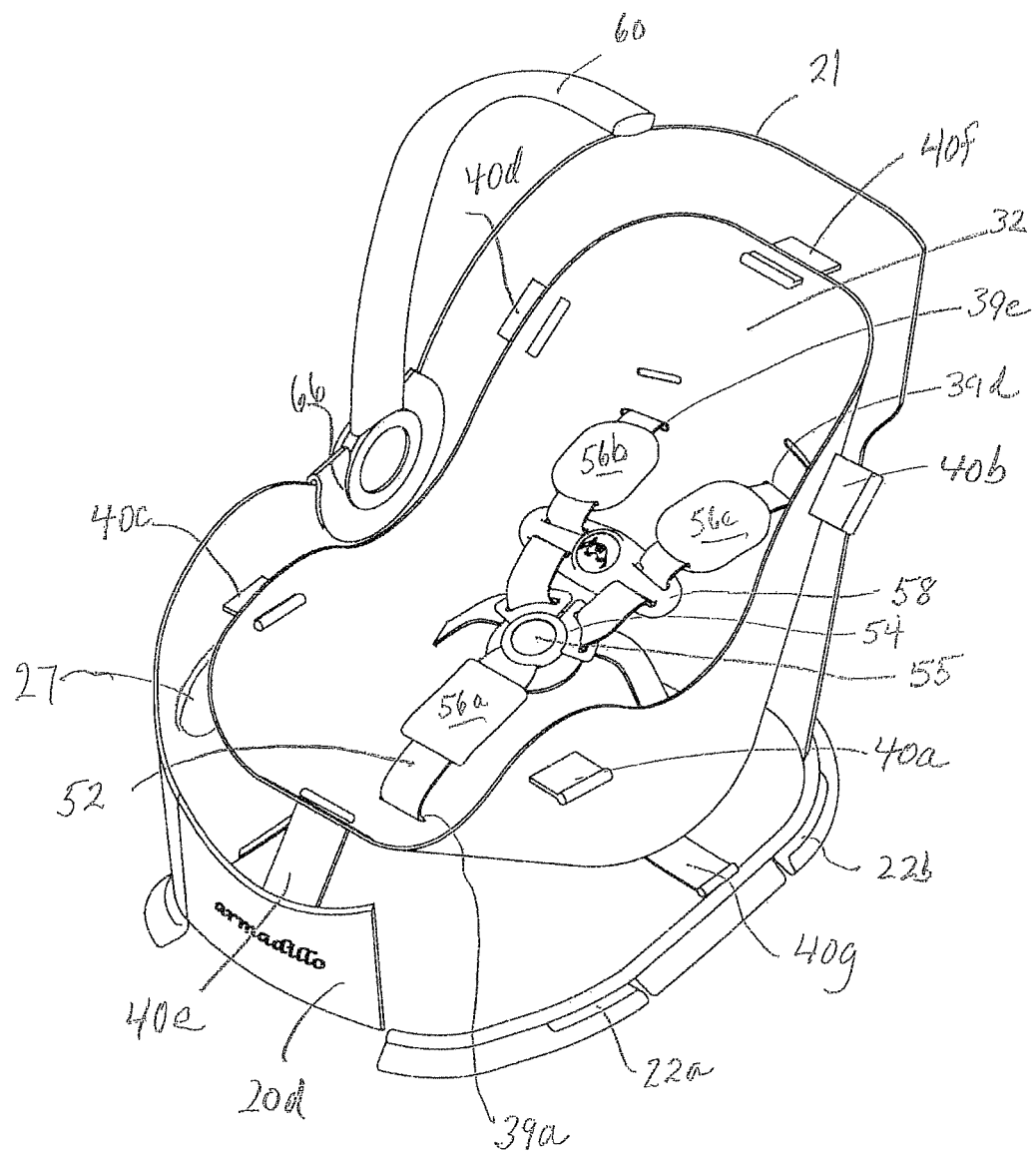
FIG. 2 is a perspective, partially broken view of the car seat of FIG. 1 without the removable fabric cover and inner seat layers.
Figure 5:
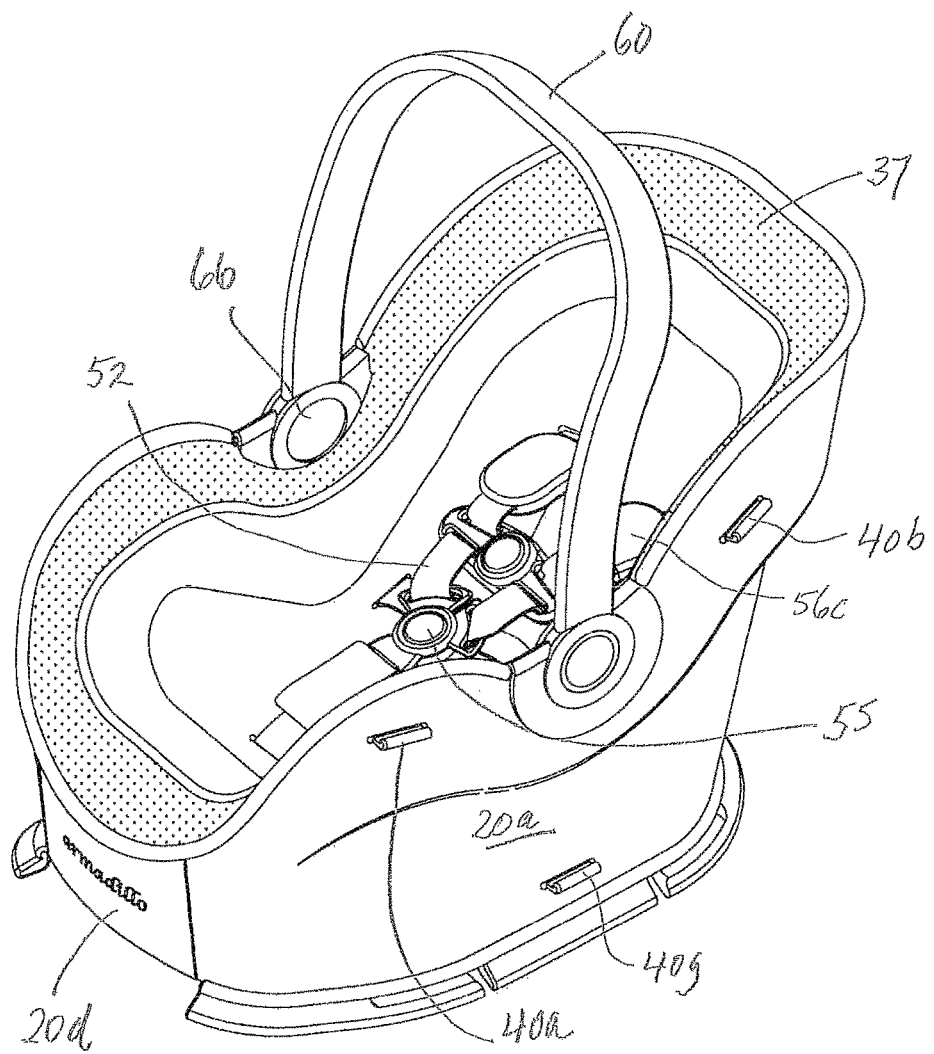
FIG. 5 is a perspective view of the car seat of FIG. 1.

One embodiment of a car seat 10 is seen in FIGS. 1-5. Car seat 10 includes an outer protective shell 20, an inner seat 30, a suspension system 40 and a harness 50. The protective shell 20 is adapted as described below to be strapped or anchored to a car frame (not shown). The inner seat 30 is connected to the protective shell 20 by the suspension system 40 such that the inner seat can move (float) a small amount relative to the protective shell 20 as described below. Thus, the outer shell 20 provides support for the seat 30 (via the suspension system 40) but is not rigidly attached thereto. The harness 50 extends through and around the inner seat 30 and is not attached to the outer protective shell 20. A handle 60 connected to the shell 20 is optionally provided.

In one embodiment, the outer protective shell or frame 20 is made from a strong, light material such as carbon fiber or an aramid fiber such as KEVLAR (a trademark of DuPont, Wilmington, Del.), or any other strong, light material. In one embodiment, the shell 20 is constructed of multiple layers of carbon fiber, aramid fiber or a composite material. In another embodiment, the outer protective shell is formed from two separated layers of carbon fiber, aramid fiber or composite material (as seen, e.g., in FIG. 4) sandwiching a honeycomb, foam, or corrugated material (not shown). In other embodiments, the shell 20 is constructed of one or more of polycarbonate, polypropylene, ABS resin, and fiberglass. One function of the shell 20 is to provide support for the seat 30 via the suspension system 40. Another function of the shell 20 is to provide protection from intrusion by exterior objects.

In one embodiment the shell 20 provides side and back walls 20a-20c and a front wall 20d that connects the side walls 20a, 20b at the front of the car seat. The back wall 20c provides a high back compared to the front wall 20d, which is low. The side walls are contoured to extend from the back to the front. The front, back and side walls provide an upper edge 21 to which or over which a seat cover may be attached as described hereinafter. All walls may be rounded to eliminate edges so there may be no exact delineation of the front, side, and back walls.

As seen in FIGS. 1-5, the side walls 20a, 20b define fore and aft slots 22a, 22b (two more slots not shown) for receiving a seat belt therethrough, thereby permitting the car seat 10 to be strapped in facing forwards or backwards. If desired a belt (not shown) may be provided having one end attached to the shell 20 and a hook (not shown) located at the other end. The hook may be used to connect to the frame of the car (not shown) located under the car's seat cushion (not shown). In another embodiment, the shell 20 may be adapted to rigidly connect to a separate base that can be strapped or anchored in place in the car. In another embodiment, the shell 20 may be adapted so that hooks from the car (not shown) can attach to the shell 20.

Shell 20 also defines a series of slots 24 for receiving the belts 40a-40g of the suspension system 40. In the embodiment shown, eight slots 24a-24h are provided, including two slots each (24a-24d) towards the top of side walls 20a, 20b, a single slot 24e in the bottom of the front wall 20d of the car seat (see FIG. 4), a single slot 24f in the top of the back wall 20c, and a single slot each 24g, 24h toward the bottom of the side walls 20a, 20b. Belts 40a-40g, as described in more detail below, couple the shell 20 to the inner seat 30. It will be appreciated that if it is desired that the belts not be seen from the outside, the slots are built into the inner side of the wall as shown for slot 24e of FIG. 4. Otherwise, the slots may extend through the walls of the shell 20 as seen with respect to slots 24a-24d, 24f-24h. For purposes herein, a "slot" in a wall may be considered a through-slot, or a hook or catch that allows attachment for the belt or attachment device to the shell 20.

In one embodiment, shell 20 also defines holes or slots (not shown) for receiving a connection mechanism or support 66 for a handle 60.

In one embodiment, a plurality of optional padding elements 27 are spaced around the inside surface 20e of the shell 20. The padding elements 27 are located such that should the shell 20 be subjected to significant forces and movement relative to the seat 30, the padding elements 27 will contact the seat 30 and largely prevent the inside surface 20e of the shell 20 from contacting the seat 30.

In one embodiment, the padding elements 27 are thick enough so that they extend from the inside surface 20e and contact the seat 30 so that should the shell 20 be subjected to significant forces and movement relative to the seat 30, the padding elements 27 will already be in contact with the seat 30 to absorb energy from the moving seat 30.

The padding elements 27 may be formed from an elastomeric, cellular foam or any other desirable foam. In another embodiment, the padding elements are comprised of thermoplastic polyurethane (TPU). In another embodiment, the pads 27 are comprised of open-cell polyurethane. In another embodiment, the pads are comprised of closed cell polyolefin foam. In another embodiment, the pads are comprised of polyethylene foam which may be a high density polyethylene foam. In one embodiment the padding elements 27 are formed as a single pad defining multiple cut-outs (i.e., the equivalent of multiple connected pads). Regardless, the single pad with the cut-outs or the multiple pads 27 are arranged in a desired configuration and are affixed to the inner surface 20e of the shell and the outer surface of inner seat 30. Affixation can be done with glue, Velcro or any other affixation means. By way of example, and not by way of limitation, the innermost cushioning pads may have a density of between 3.4 lbs/ft$^3$ (approximately 0.016 g/cm$^3$) and 25 lbs/ft$^3$ (approximately 0.4 g/cm$^3$), although they may be more dense or less dense.

The outer dimensions of the shell 20 may vary widely. The shell 20 may be between 40 and 70 cm wide, or even narrower or wider, and between 20 and 60 cm deep, or even shallower or deeper, and between 50 and 80 cm high, or even shorter or taller. In one exemplary embodiment the outer dimensions of the shell is 50 cm wide (plus or minus 5 cm), 28 cm deep (plus or minus 3 cm), and 68 cm high (plus or minus 7 cm).

The inner seat 30 is scooped in shape with a relatively high back, a deep seat area (for the buttocks), and a slightly rising surface for the thighs and legs. In one embodiment, the inner seat 30 is a protective seat made from a multi-layered construction. In one embodiment the inner seat includes a flexible hard outer shell layer 32, a cushioning spacer layer 34, and uniform foam layer 35, and an attached fabric or leather layer 37. The cushioning spacer layer 34 does not cover the entire inside of the hard outer shell layer 32 nor the entire outside of the uniform foam layer 35. The fabric or leather layer 37 can extend beyond the inner seat 30 and attaches to the edge 21 of the shell 20 but does not inhibit seat 30 from moving relative to the shell 20. In another embodiment the multi-layered construction of the inner seat includes (from outside to inside) a hard outer shell layer 32, a cushioning spacer layer 34, and a uniform foam layer 35. An optional plastic, leather, or fabric layer (not shown) may be provided over the foam layer 35. A separate removable seat cover can be provided that extends over the seat 30 and attaches to the edge 21 of the shell 20. Again, the separate removable seat cover would not inhibit seat 30 from moving relative to the shell 20. The inner seat construction is arranged to redirect energy transmitted from the outer shell along a circuitous path so as to absorb the energy. The inner seat 30 also defines a plurality of (e.g., eight) slots 38a-38h for receiving belts 40a-40g of the suspension system 40, and a series of slots 39a-39e for receiving belts 52 of harness 50.

In one embodiment, the hard outer shell layer 32 of inner seat 30 is comprised of a polycarbonate shell. In another embodiment, the hard outer shell 32 is comprised of a different hard plastic such a polypropylene. In another embodiment, the hard outer shell 32 is comprised of ABS resin. In another embodiment, the hard outer shell layer 32 is made of carbon fiber or fiberglass.

In one embodiment, the cushioning spacer layer 34 of inner seat 30 includes multiple spaced pads. In another embodiment, the cushioning spacer layer 34 comprises a single pad defining multiple cut-outs 34a (i.e., the equivalent of multiple connected pads). In one embodiment the cushioning spacer layer 34 is comprised of foam. The foam may be an elastomeric cellular foam or any other desirable foam. In another embodiment, the cushioning spacer layer is comprised of thermoplastic polyurethane (TPU). In another embodiment, the cushioning spacer layer is comprised of open-cell polyurethane. In another embodiment, the cushioning spacer layer is comprised of closed cell polyolefin foam. In another embodiment, the cushioning spacer layer is comprised of polyethylene foam which may be a high density polyethylene foam. In another embodiment, the cushioning spacer layer 34 has multiple layers formed from different materials. By way of example and not by way of limitation, the cushioning spacer layer may be between 3 mm and 26 mm thick, although it may be thinner or thicker. As another example, the cushioning spacer layer may be between 6 and 13 mm thick. By way of example, and not by way of limitation, the cushioning spacer layer may have a density of between 3.4 lbs/ft$^3$ (approximately 0.016 g/cm$^3$) and 25 lbs/ft$^3$ (approximately 0.4 g/cm$^3$), although it may be more dense or less dense.

According to one embodiment, the cushioning spacer layer 34 covers approximately fifty percent of the inner surface area of the hard outer shell 32. In another embodiment, the spacer layer 34 covers between twenty percent and eighty percent of the inner surface area of the hard shell 32. In these embodiments, the spacer layer defines air gaps located between said hard outer shell 32 and said foam layer 35. The spacer layer 34 should cover sufficient area between the hard shell 32 and the foam layer 35 so that upon external impact to the inner seat 30, the shell 32 does not directly come into contact with the foam layer 35. Regardless of the material and arrangement of the cushioning spacer layer 34, in one embodiment the cushioning material is affixed to the hard shell layer 32 and to the foam layer 35. Affixation can be done with glue, Velcro or any other affixation means.

Cushioning spacer layer 34 is also provided with a series of slots 34b corresponding to slots 39a-39e of the flexible hard outer shell layer 32 for receiving the harness straps.

In one embodiment the foam layer 35 is a substantially continuous uniform layer interrupted only by slots 35a for the belts of the harness 50. The foam may be an elastomeric, cellular foam or any other desirable foam. In one embodiment, the foam layer 35 is comprised of closed cell polyolefin foam. In another embodiment, the foam layer is comprised of polyethylene foam which may be a high density polyethylene foam. By way of example and not by way of limitation, the foam layer may be between 3 mm and 13 mm thick, although it may be thinner or thicker. By way of example, and not by way of limitation, the foam layer may have a density of between 3.4 lbs/ft$^3$ (approximately 0.016 g/cm$^3$) and 25 lbs/ft$^3$ (approximately 0.4 g/cm$^3$), although it may be more dense or less dense.

All dimensions of the inner seat 30 are generally chosen to be smaller than the dimensions of the shell 20. Thus, inner seat 30 is suspended substantially within the shell 20 and generally protected by the shell 20.

The suspension system 40 functions to suspend the inner seat 30 relative to the outer shell 20 and to thereby act as a shock absorber/isolater between the shell 20 and the seat 30. In one embodiment, the suspension system 40 is a seven point suspension system with seven webs or belts 40a-40g. Some or all of the webs or belts 40a-40g may be the same length. Thus, by way of example only, belts 40a-40f may each be between approximately 2 cm and 5 cm in length, while belt 40g may be between 30 cm and 50 cm in length. Belt 40g is shown as extending through slots 38g and 38h in the buttocks area of the outer seat layer 32 and attaching to sides 20a and 20b of the shell 20 at slots 24g, 24h. Of course, other lengths may be used. If desired, belt 40g may be attached to the back wall 20c of the shell 20. In one embodiment, the belts extend through the slots 24a-24h in the shell 20 and the slots 38a-38h in the inner seat 30 and are doubled over at each end and sewn at each end to prevent removal. In another embodiment, the ends of each belt extend around a stick or other object and are sewn so that the ends are too thick to remove through the slots. The webs or belts may be formed from a thick web of strong material such as polyester or nylon.

In one embodiment the harness 50 is a five-point harness as is known in the art. The harness 50 includes belt(s) 52 such that a central (crotch) belt or strap extends through slot 39a of seat 30, a lap belt extends through slots 39b, 39c of the seat 30, and shoulder belts extend through slots 39d and 39e of seat. Buckles and latches 54 may be provided with a push button 55 that permits release of the buckles. Guard pads 56a, 56b, 56c may be provided on the crotch and shoulder belts, and a clip 58 coupling the shoulder belts may be provided. The entire harness system 50 may be formed from standard materials and may constitute a standard five-point harness system that acts to keep the passenger in the seat 30. As will be appreciated, the belt(s) of the harness extend through slots in the layers of seat 30 and extend around the front and backside of the seat 30, but are not attached directly to the seat 30. The belt(s) 52 are optionally adjustable in length.

Optional handle 60 is attached by support mechanisms 66 to respective sides 20a, 20b of the shell 20. Handle 60 may swivel relative to support mechanisms 66 as is known in the art.

The embodiments of the car seat described with reference FIGS. 1-5 provide a highly protective, safe, and strong car seat system. In particular, because of the suspension system, in case the car in which the car seat is anchored is in an accident that causes sudden acceleration and/or deceleration of the car, force that is applied to the shell which is anchored to the car is not transferred to the inner seat and is therefore not applied to the occupant of the seat. More particularly, in the case of an accident, regardless of the direction in which the seat is facing and regardless of whether the result is a sudden acceleration and/or deceleration, the inner seat will move inside the shell, and the suspension system will absorb some, much, or all of the energy. The inner seat will swing inside the shell to the extent allowed by the belts of the suspension system (it being appreciated that the fabric or leather covering will easily comply). In addition, should the force be significant enough to cause the inner seat and shell to contact each other (at the optional foam pads on the inside of the shell), the construction of the inner seat with its foam spacer layer located between a hard outer layer and an inside foam layer is energy absorbing. Thus, some, most, or all of the energy that is transferred from the shell to the inner seat will be absorbed by the seat itself rather than transferred to the occupant of the seat. Furthermore, should the accident cause dislocation of the interior of the car or should an object hit the shell of the car seat, the shell is of extremely high strength and will remain structurally intact in almost all circumstances. Thus, the occupant of the car seat will not be crushed and will be protected by the foam padding of the seat. Further yet, it should be appreciated that the described car seat system will be light in weight (e.g., under 4 kg; and possibly around 3 kg).

Figure 6:
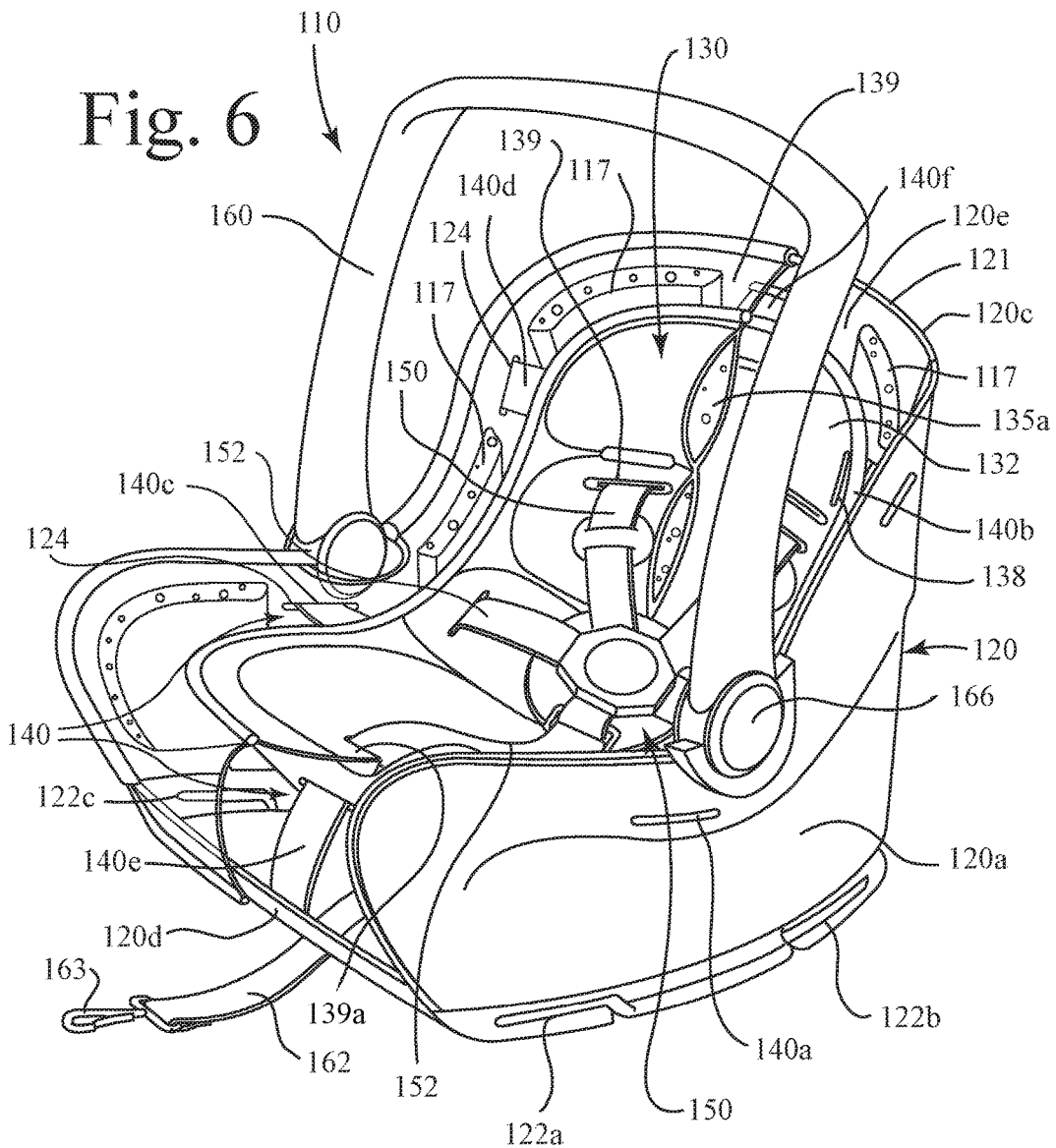
FIG. 6 is a perspective, partially cut-away, partially transparent view of another embodiment of a car seat.

FIG. 6 provides an alternate embodiment of a car seat 110 that is similar to car seat 10 of FIGS. 1-5, with similar elements numbered similarly but increased by "100". Car seat 110 includes an outer protective shell 120, an inner seat 130, a suspension system 140 and a harness 150. The protective shell 120 is adapted as described below to be strapped or anchored to a car frame (not shown). The inner seat 130 is connected to the protective shell 120 by the suspension system 140 such that the inner seat can move (float) a small amount relative to the protective shell 120 as described below. Thus, the shell 120 provides support for the seat 130 (via the suspension system 140) but is not rigidly attached thereto. The harness 150 is attached to the inner seat 30 and not to the outer protective shell 120. A handle 160 connected to the shell 120 is optionally provided.

The outer protective shell 120 can be made from the same material as shell 20 of FIGS. 1-5. Shell 120 provides side and back walls 120a-120c and a front wall or slat 120d that connects the side walls 120a, 120b at the front of the car seat. The back wall 120c provides a high back compared to the front wall 120d which is low and short. The side walls are contoured to extend from the back to the front. The front, back and side walls provide an upper edge 121 to which or over which a seat cover may be attached as described hereinafter.

As seen in FIGS. 1-5, the side walls 120a, 120b define fore and aft slots 122a, 122b, 122c (one more slot not shown) for receiving a seat belt therethrough, thereby permitting the car seat 110 to be strapped in facing forwards or backwards. In addition, or alternatively, a belt 162 is provided having one end attached to the shell 120 and a hook 163 located at the other end. The hook 163 may be used to connect to the frame of the car (not shown) located under the car's seat cushion (not shown). In another embodiment, the shell 120 may be adapted to rigidly connect to a separate base that can be strapped or anchored in place in the car.

Shell 120 also defines a series of slots 124 for receiving the belts 140 (belts 140a-140f shown; one belt not shown) of the suspension system 140. Seven slots are provided, including two slots each in side walls 120a, 120b, a single slot in the front wall 120d of the car seat, a single slot in the top of the back wall 120c, and a single slot in the bottom of the back wall 120c. Belts 140 couple the shell 120 to the inner seat 130.

Shell 120 also defines holes, slots, or surfaces for receiving a connection mechanism or support 166 for a handle 160. Also, a plurality of padding elements 127 are spaced around the inside surface 120e of the shell 120. The padding elements 127 are located such that should the shell 120 be subjected to significant forces and movement relative to the seat 130, the padding elements 127 will contact the seat 130 and largely prevent the inside surface 120e of the shell 120 from contacting the seat 130. The padding elements 127 may be formed from the same materials discussed above with reference to padding elements 27 of FIGS. 1-5.

The inner seat 130 is scooped in shape with a relatively high back, a deep seat area (for the buttocks), and a slightly rising surface for the thighs and legs. The inner seat 30 is a protective seat made from a multi-layered construction. The inner seat includes a hard outer shell 132, and an attached fabric or leather layer 139 that incorporates foam pillows 135a therein. The fabric or leather layer 139 extends beyond the inner seat 130 and attaches to the edge 121 of the shell 120 but does not inhibit seat 130 from moving relative to the shell 120. The inner seat 130 also defines a plurality of (e.g., seven) slots 138 for receiving belts of the suspension system 140, and a series of slots 139 for receiving belt(s) 152 of the harness system 150. The hard outer shell 132 of inner seat 130 may be formed from the same materials discussed above with reference to shell 32 of FIGS. 1-5.

The suspension system 140 functions to suspend the inner seat 130 relative to the outer shell 120 and to thereby act as a shock absorber/isolater between the shell 120 and the seat 130. The suspension system 140 is a seven-point suspension system with seven webs or belts (six shown 140a-140f). The belts may be configured and formed in a manner such as belts 40a-40g of FIGS. 1-5.

The harness 150 is a five-point harness system with belt(s) 152 that include a central (crotch) belt attached through slot 139a of seat 130 and shoulder belts and lap belts attached through similar slots of the seat. The entire harness system 150 may be formed from standard materials. As will be appreciated, the belt(s) of the harness extend through slots in the layers of seat 130 and extend around the front and backside of the seat 130, but are not attached directly to the seat 130. The belt(s) 152 are optionally adjustable in length.

Optional handle 160 is attached by support mechanisms 166 to respective sides 120a, 120b of the shell 120. Handle 160 may swivel relative to support mechanisms 166 as is known in the art.

The embodiments described with reference to FIG. 6 provides a highly protective, safe, and strong car seat system similar to that of the embodiments described with reference to FIGS. 1-5, although it is noted that the inner seat of FIG. 6 itself is not as energy absorbent as the inner seats described with reference to FIGS. 1-5.

Figure 7:
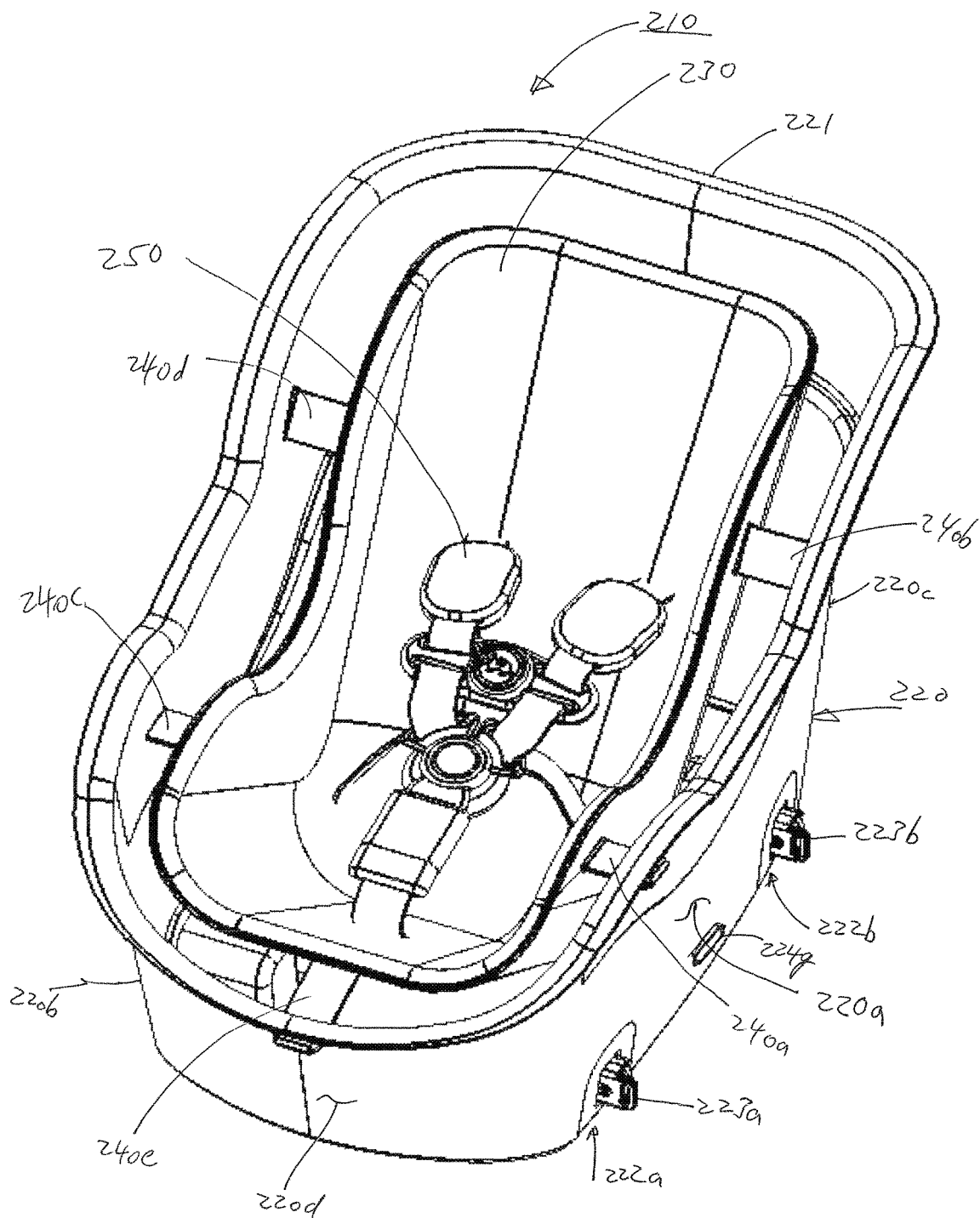
FIG. 7 is a perspective view of another embodiment of a car seat.
Figure 15:
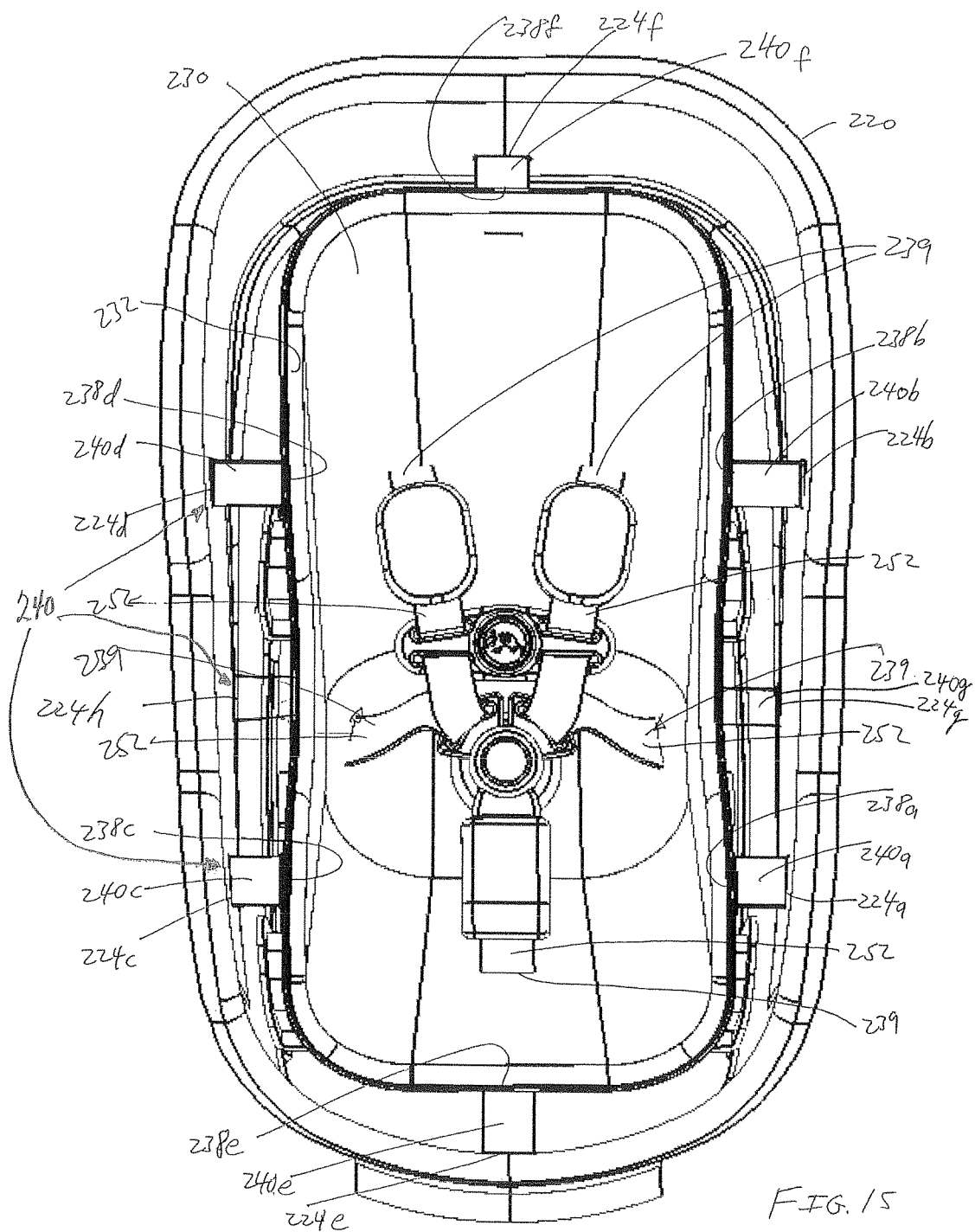
FIG. 15 is a top plan view of the car seat shown in FIG. 7.

FIG. 7 shows an alternate embodiment of a car seat 210 that is similar to car seat 10 of FIGS. 1-5, with similar elements numbered similarly but increased by "200". Car seat 210 includes an outer protective shell 220, an inner seat 230, a suspension system 240 (FIG. 15). The protective shell 220 is adapted as described below to be strapped or anchored to a car frame (not shown). The inner seat 230 is connected to the protective shell 220 by the suspension system 240 such that the inner seat can move (float) a small amount relative to the protective shell 220 as described below. Thus, the shell 220 provides support for the seat 230 (via the suspension system 240) but is not rigidly attached thereto.

The harness 250 is attached to the inner seat 230 and not to the outer protective shell 220. A handle (not shown), like handle 60 shown in FIG. 1, connected to the shell 220, is optionally provided.

The outer protective shell 220 can be made from the same material as shell 20 of FIGS. 1-5. Shell 220 provides side and back walls 220a-220c and a front wall or slat 220d that connects the side walls 220a, 220b at the front of the car seat. The back wall 220c provides a high back compared to the front wall 220d, which is low and short. The side walls are contoured to extend from the back to the front. The front, back and side walls provide an upper edge 221 to which or over which a seat cover may be attached as described hereinafter.

Figure 8:
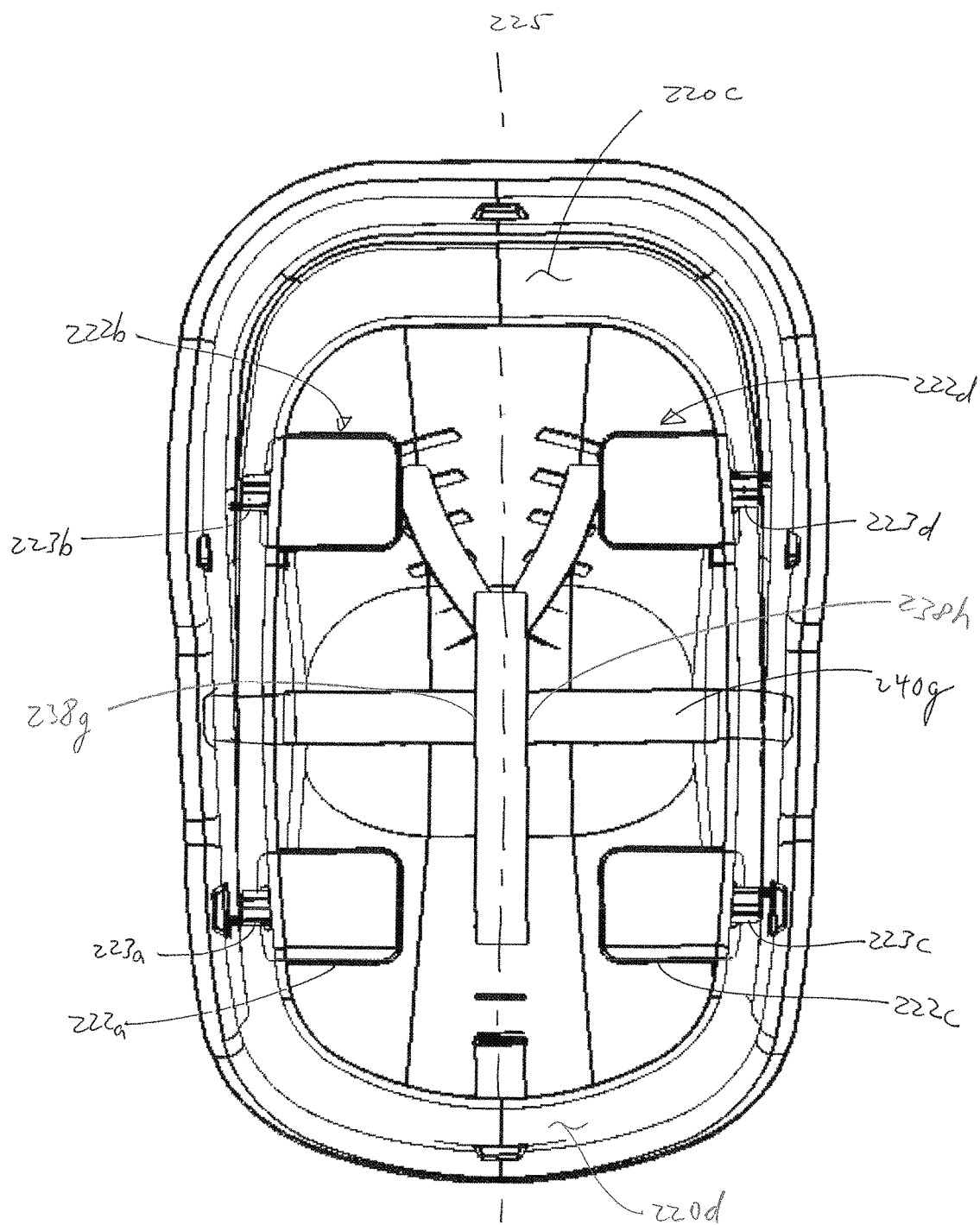
FIG. 8 is a view of the bottom of the car seat shown in FIG. 7.
Figure 9:
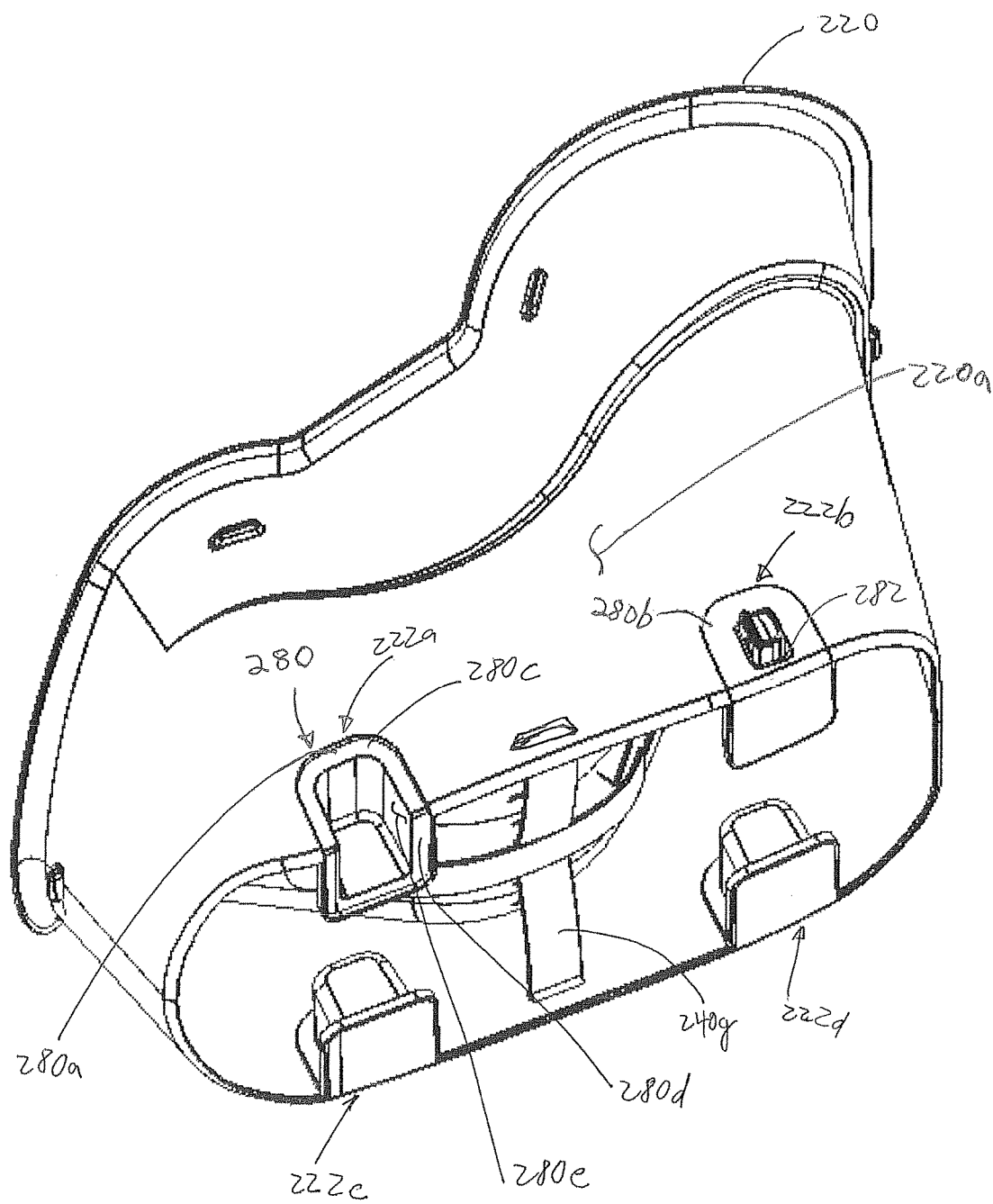
FIG. 9 is a perspective view of the side and bottom of the outer shell of the car seat shown in FIG. 7 with a tether connector in one anchor box.

As shown in FIGS. 7 and 8, side wall 220a defines fore and aft anchor boxes 222a and 222b for receiving corresponding tether connectors 223a and 223b, while side wall 220b defines fore and aft anchor boxes 222c and 222d for receiving corresponding tether connectors 223c and 223d, thereby permitting the car seat 210 to be connected to the vehicle in either a forward-facing or a rear-facing orientation. The tether connectors 223a-223d can be LATCH or ISOFIX connectors, which are well known. The anchor boxes 222a-222d are generally located proximate to the "corners" of the outer shell 220 as shown in FIGS. 7 and 8. Though not shown in FIG. 8, optional anchor boxes can be located in the front wall 220d and/or the back wall 220c.

As shown in FIG. 8, anchor boxes 222a-222d receive respective tether connectors 223a-223d (e.g., LATCH or ISOFIX connectors) in a direction that is at an angle with respect to a longitudinal axis 225 of the car seat 210. Specifically, in the embodiment shown in FIG. 8, the tether connectors 223a-223d extend substantially perpendicular to the longitudinal axis 225.

In one embodiment anchor boxes 222a-222d are constructed exactly the same and, therefore, to simplify the following discussion only a description of anchor box 222a will be given as representative of the other anchor boxes 222b-222d. Likewise, in one embodiment the tether connectors 223a-223d are constructed exactly the same and, therefore, to simplify the following discussion only a description of tether connector 223a will be given as representative of the other tether connectors 223b-223d.

The construction of anchor box 222a is best understood with reference to FIGS. 9 and 10A-10D. The anchor box 222a includes a housing 280 (FIGS. 9, 10A, 10C), a sleeve 282 (FIG. 10C) coupled to the housing 280 with a pin 284 (FIGS. 10C, 10D), and inserts 286 (FIGS. 10C and 10D) interposed between the housing 280 and the sleeve 282. The housing 280 includes a base 280a and a cover 280b which attach together, although the cover 280b (as well as the sleeve 282, pin 284, and inserts 286) of anchor box 222a is shown removed in FIG. 9 for illustrative purposes. The base 280a has an outer flange 280c (FIGS. 10C and 10D) that surrounds a cutout formed along the bottom edge of side 220a. The base 280a has an inner portion 280d (FIGS. 10C and 10D) that extends inward from the outer flange 280c at an angle with respect to axis 225, and in one embodiment in a direction generally perpendicular to axis 225. The inner portion 280d defines a channel 280e (FIGS. 10C and 10D) rectangular in cross-section, in which the sleeve 282, the pin 284, and inserts 286 are disposed. In one embodiment the channel 280e has a square cross section having dimensions of about 2 inches by 2 inches. The base 280a may be integrally formed with wall 220a of the outer shell 220 or may be a separate piece that is attached to the wall 220a.

As shown in FIG. 10D, the sleeve 282 is pinned to the inner portion 280d by pin 284 and is spaced from the surface of the channel 280e by inserts 286 (286a-286c). Pin 284 extends through sleeve 282 and through sides of inner portion 280d in a direction parallel to the axis 225. The sleeve 282 is constructed to receive tether connector 223a. The portion of pin 284 inside the sleeve 282 is constructed to permit a latch mechanism of tether connector 223a to attach to the pin 284 when the tether connector 223a is fully inserted into the housing 280. Preferably, the tether connector 223a is removably attachable to the pin 284. Such removably attachable tether connectors 223 are well known and include LATCH and ISOFIX connectors.

The inserts 286 shown in the embodiment of FIGS. 10C and 10D are generally ring-like, having an inner surface that surrounds and contacts the outer surface of sleeve 282 and having an outer surface that contacts the wall of channel 280e. In the embodiment shown in FIGS. 10C and 10D the inner and outer surfaces of the inserts 286 define a square profile corresponding to the square profiles of the sleeve 282 and the channel 280e. It is to be understood, however, that the inserts 286 may have other profiles to conform to the geometries of the sleeve 282 and channel 280e. For example, in one alternate embodiment shown in FIG. 10E, an anchor box 322a in wall 220a includes a housing 380 having an outer cover 380b connected to an inner portion 380a. The inner portion 380a defines a channel 380e which is tapered inwardly from the side of the outer shell 220 (not shown) and is trapezoidal in cross-section. Each insert 386a-386c in FIG. 10E has an outer surface that is tapered to conform to the tapered profile of channel 380e. Thus, it is to be understood that all of the inserts 386a-386c may have different profiles and dimensions based on their relative position along sleeve 382 within the anchor box 322a. Moreover, instead of a plurality of separate, spaced-apart inserts 386a-386c, a unitary elongated insert (not shown) may be employed which occupies some or all of the space between sleeve 282 (382) and channel 280e (380e). For example, such the unitary elongated insert may take the form of a sleeve or jacket in which sleeve 282 (382) is received and which has openings for pin 284 (384). In one embodiment, the inserts 286 (386) are formed of a compressible material, such as a foam. More specifically, in one embodiment inserts 286 (386) are formed of a foam having a density between 580 pounds per square inch and 2,900 pounds per square inch, manufactured by Sorbothane Inc. of Kent, Ohio.

Although the sleeve 282 (382) is coupled to the housing 280 (380) by pin 284 (384), the sleeve 282 (382) has some freedom of motion relative to the housing 280 (380). The sleeve 282 (382) can rotate and translate longitudinally about an axis along pin 284 (384). In addition, the sleeve 282 (382) can rotate about an axis 287 (FIG. 10D) (387, FIG. 10E) through and perpendicular to the axis along pin 284 (384). Such motion about axis 287 (387) can be accomplished by forming through holes in sleeve 282 (382) (through which pin 284 (384) extends) slightly larger than the outer diameter of pin 284 (384).

The relative movement of sleeve 282 (382) with respect to housing 280 (380) is limited by the inserts 286a-286c (386a-386c), which are constructed to compress or expand in response to the relative movement between the sleeve 282 (382) and the housing 280 (380). The relative movement between the sleeve 282 (382) and the housing 280 (380) occurs as a result of force and torque transmitted by the tether connector 223a to the sleeve 282 (382) during impact of the vehicle, as discussed more fully below.

Figure 11:
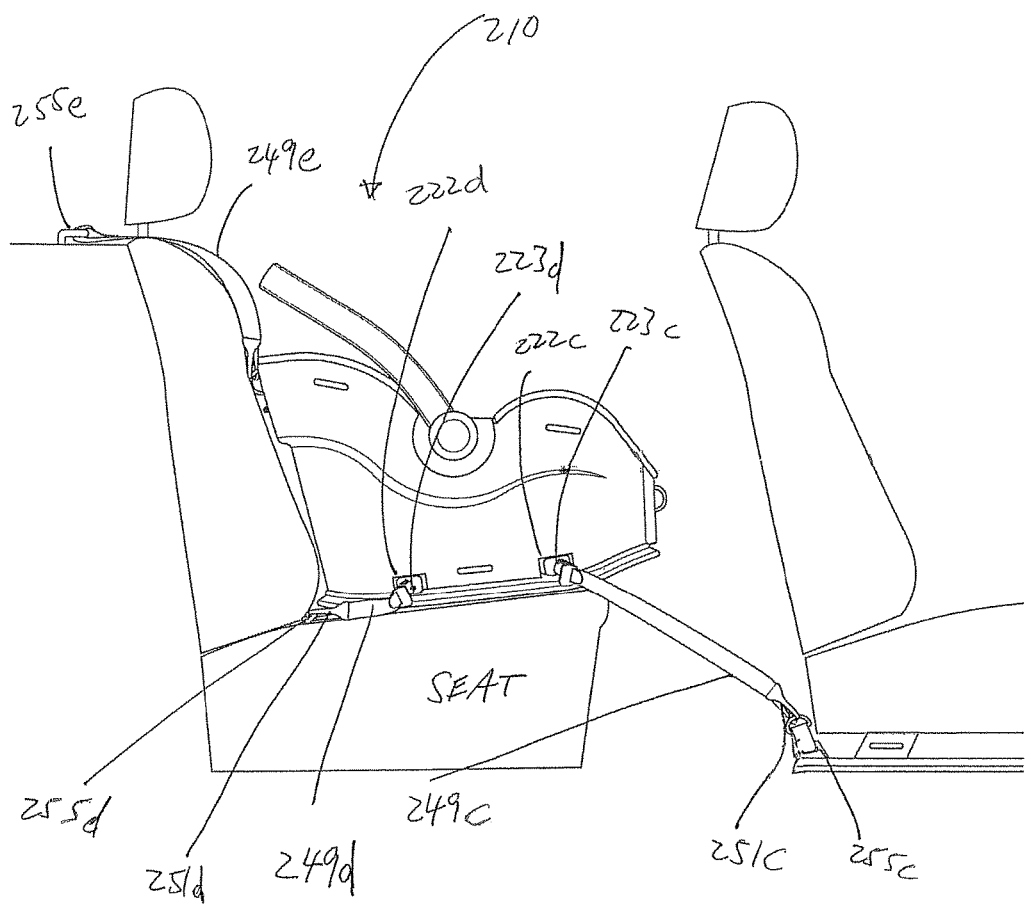
FIG. 11 is an elevation view of an embodiment of a car seat in a front facing orientation in a vehicle.
Figure 12:
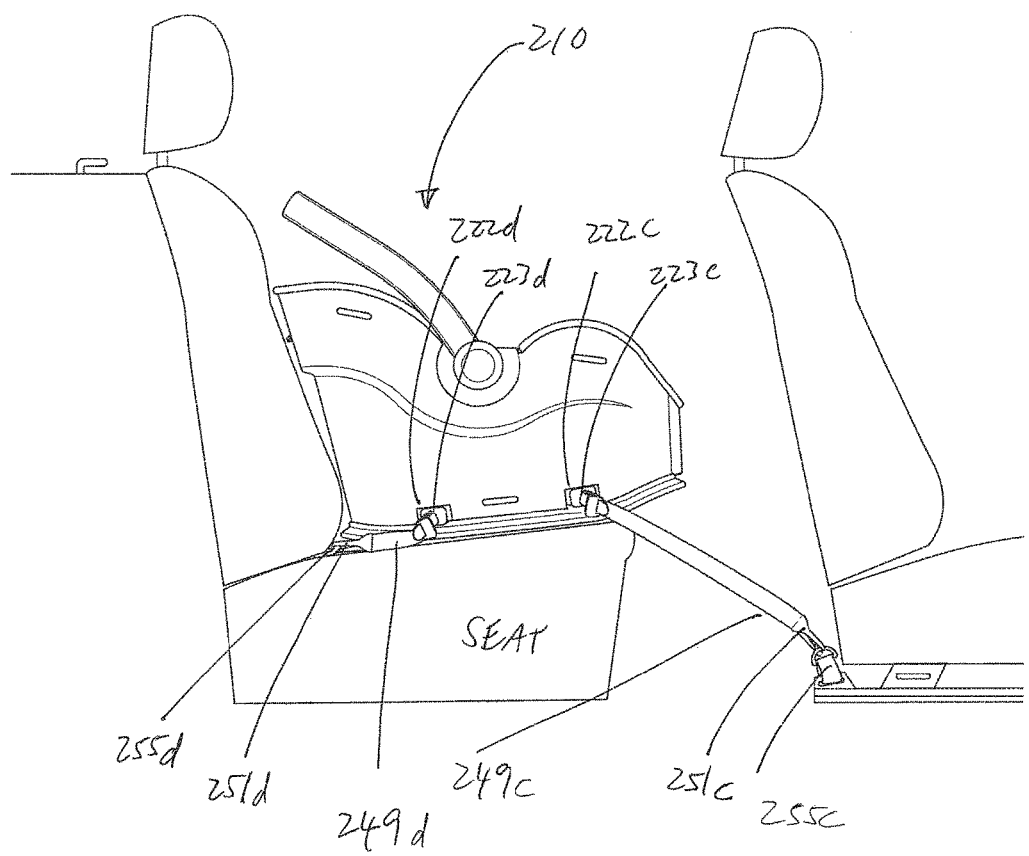
FIG. 12 is an elevation view of an embodiment of a car seat in a front facing orientation in a vehicle.

As shown in FIGS. 11 and 12, where the car seat 210 is placed in a forward-facing orientation in the vehicle, tether connectors 223c and 223d are connected, respectively to tether straps 249c and 249d, which also have second tether connectors 251c and 251d at opposite ends of the tether straps 249c and 249d for attachment to anchor points 255c and 255d of the vehicle. In one embodiment, the tether straps 249c and 249d are adjustable to facilitate vehicle installation. Preferably, tether connectors 251c and 251d are LATCH or ISOFIX connectors and anchor points 255c and 255d are LATCH or ISOFIX anchor points. In particular, anchor box 222c connects to a corresponding anchor point 255c of the vehicle located in front of the vehicle seat, and anchor boxes 222d connects to a corresponding anchor point 255d of the vehicle at the rear of the vehicle seat, such as at an intersecting location between the seat back and the seat bottom. While not shown in FIGS. 11 and 12, the connections of anchor boxes 222a and 222b to the vehicle would be mirror images to that shown in FIGS. 11 and 12. In addition, in the embodiment shown in FIG. 11, an upper tether strap 249e is connected between an upper anchor point 255e of the vehicle and the back side 220c of the outer shell 220.

Figure 13:
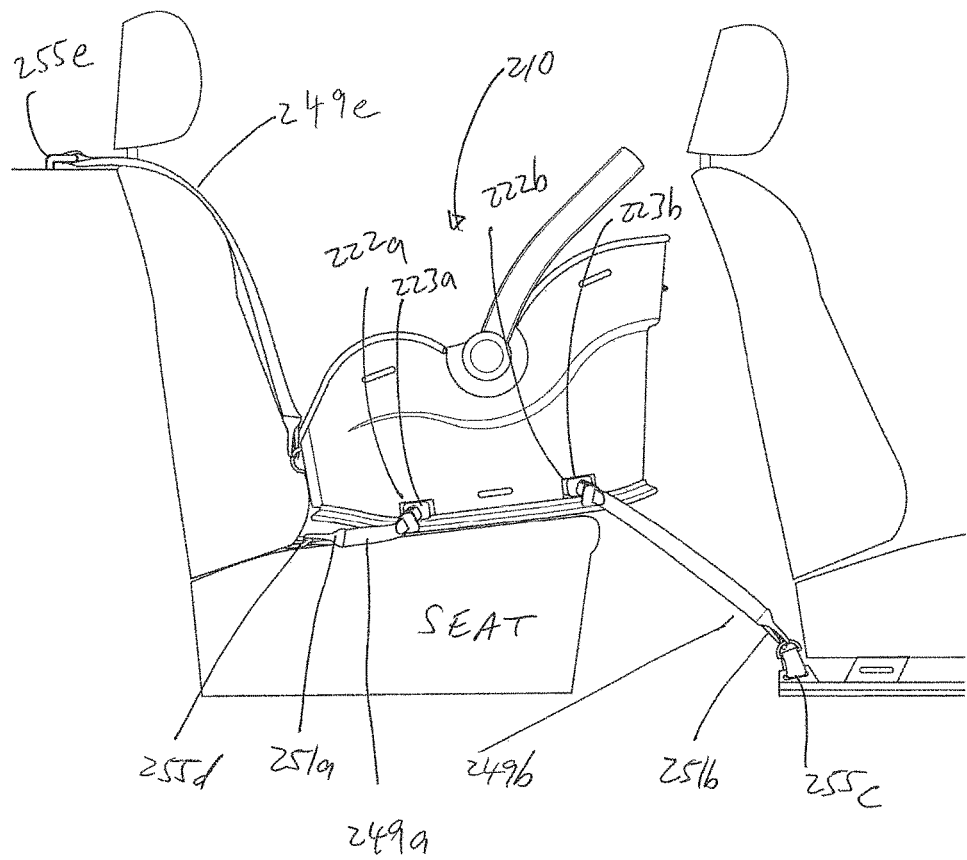
FIG. 13 is an elevation view of an embodiment of a car seat in a rear facing orientation in a vehicle.
Figure 14:
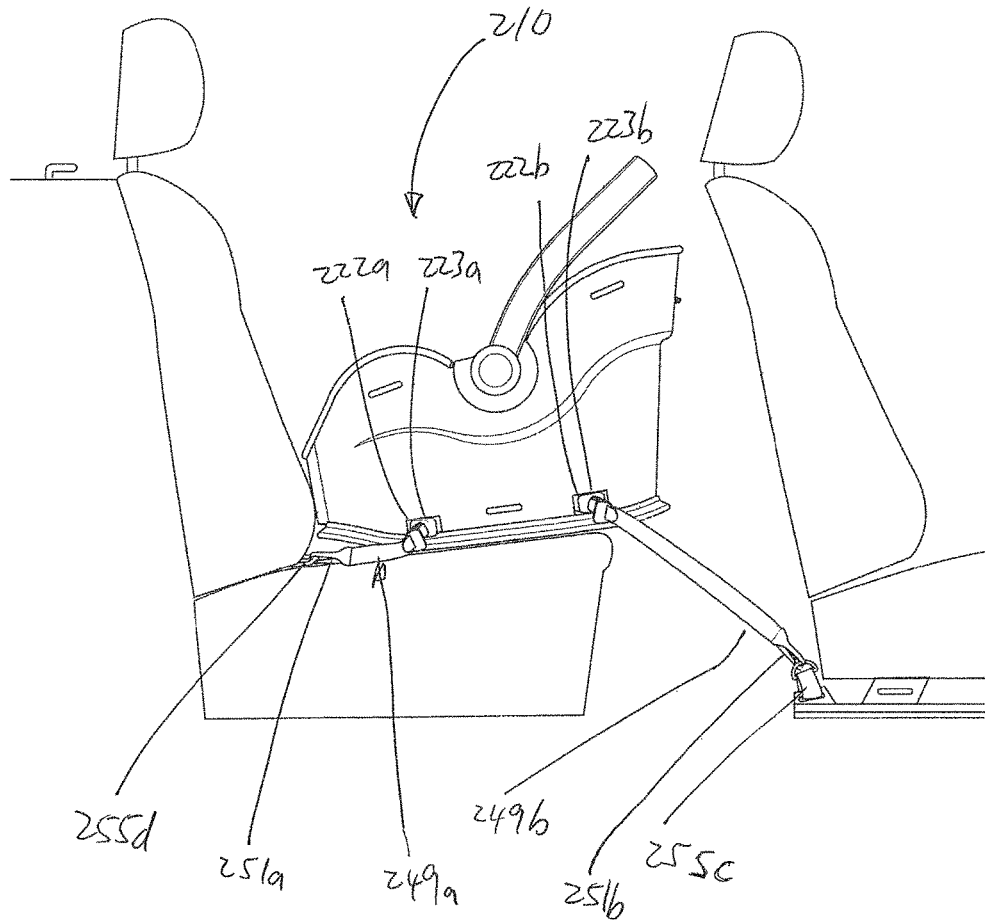
FIG. 14 is an elevation view of an embodiment of a car seat in a rear facing orientation in a vehicle.

As shown in FIGS. 13 and 14, where the car seat 210 is placed in a rear-facing orientation in the vehicle, tether connectors 223a and 223b are connected, respectively to tether straps 249a and 249b, which also, preferably, have second tether connectors 251a and 251b at opposite ends of the tether straps 249a and 249b for attachment to anchor points 255d and 255c of the vehicle. In one embodiment, the tether straps 249a and 249b are adjustable to facilitate vehicle installation. Preferably, tether connectors 251a and 251b are LATCH or ISOFIX connectors and anchor points 255d and 255c are LATCH or ISOFIX anchor points. In particular, anchor box 222b connects to a corresponding anchor point 255c of the vehicle located in front of the vehicle seat, and anchor box 222a connects to a corresponding anchor point 255d of the vehicle at the rear of the vehicle seat, such as at an intersecting location between the seat back and the seat bottom. While not shown in FIGS. 13 and 14, the connections of anchor boxes 222c and 222d to the vehicle would be mirror images to that shown in FIGS. 13 and 14. In addition, in the embodiment shown in FIG. 13, the upper tether strap 249e is connected between the upper anchor point 255e of the vehicle and the front side 220d of the outer shell 220.

When the anchor boxes 222a-222d are connected to the vehicle, as described above in connection with FIGS. 11 to 14, the aforementioned tether straps (e.g., 249a-249d) will extend generally parallel to the longitudinal axis 225 of the car seat 210. Therefore, for example, any load applied to anchor box 222a via tether connector 223a and strap 249a (FIG. 13) during impact is not applied in a direction along the longitudinal axis 225. Instead, owing to tether connector 223a (FIG. 13) extending at an angle relative to the longitudinal axis 225, the tether connector 223a creates a moment arm at which the load from impact will act to advantageously transmit a torque to anchor box 222a, as discussed more thoroughly below.

Anchor box 222a is intentionally structurally inefficient so that it can absorb the force and torque from the tether connector 223a during impact of the vehicle. Referring back to FIGS. 10D and 10E, the inserts 286a-286c (386a-386c) are constructed to absorb at least some of the energy transmitted through the tether straps to the car seat 210 during impact. Specifically, when the tether strap 249a extends parallel to the longitudinal axis 225 of the seat 210, as shown in FIGS. 13 and 14, and the force in the tether strap 249a is applied through the tether connector 223a, the tether connector 223a in the sleeve 282 (382) will exert a moment on sleeve 282 (382) about axis 287 (387). The moment applied to sleeve 282 (382) will tend to rotate the sleeve 282 (382) about the axis 287 (387), which will tend to compress the inserts 286a-286c (386a-386c) against the channel 280e (380e), thereby absorbing some of the energy from the impact. Moreover, in the alternate embodiment shown in FIG. 10E, the width of insert 386a is greater than insert 386b, which has a width greater than insert 386c. In comparison to the arrangement of sleeve 282 about axis 287 shown in FIG. 10D, the arrangement shown in FIG. 10E allows more rotation of sleeve 382 about axis 387 and therefore absorbs more energy for the same amount of insert material. In addition, to further absorb energy from the impact, the moment exerted on the sleeve 282 (382) will also be partially transmitted through the pin 284 (384) and the base 280a (380a) of the housing 280 (380) to the side 220a of the outer shell 220. Owing to the energy absorbed by inserts 286a-286c (386a-386c), the force exerted on the base 280a (380a) can be reduced. Consequently, the force exerted on side 220a and the deflection of the housing 280 (380) with respect to the side 220a can be reduced. Thus, the construction and orientation of anchor box 222a (323a) reduces the amount of energy transmitted to the outer shell 220 and, therefore, to the occupant of the car seat 210.

As shown in FIG. 15, shell 220 also defines a series of eight slots 224a-224h for receiving seven belts 240a-240g of the suspension system 240. Seven slots are provided, including three slots each in side walls 220a, 220b, a single slot in the front wall 220d of the car seat, and a single slot in the top of the back wall 220c. Belts 240a-240g couple the outer shell 220 to the inner seat 230.

The inner seat 230 is scooped in shape with a relatively high back, a deep seat area (for the buttocks), and a slightly rising surface for the thighs and legs. The inner seat 230 is a protective seat made from a multi-layered construction which is identical to seat 30, described above. The inner seat 230 also defines a plurality of (e.g., eight) slots 238a-238f (FIG. 15), 238g (FIG. 8), and 238h (FIG. 8) for receiving the belts 240a-240f (FIG. 15) and 240g (FIG. 8) of the suspension system 240, and a series of slots 239 for receiving belt(s) 252 of the harness system 250. The hard outer shell 232 of inner seat 230 may be formed from the same materials discussed above with reference to shell 32 of FIGS. 1-5.

The suspension system 240 functions to suspend the inner seat 230 relative to the outer shell 220 and to thereby act as a shock isolator between the shell 220 and the seat 230. The suspension system 240 is a seven-point suspension system with seven webs or belts (six shown 240a-240f in FIG. 15 and one shown 240g in FIG. 8). The belts 240a-240g may be configured and formed as described below.

In the embodiment shown in FIGS. 8 and 15, all of the belts 240a-240g share the same construction. Accordingly, to simplify the discussion, a description of belt 240a is provided below as representative of the construction and function of all of the belts 240a-240g.

Figure 16:
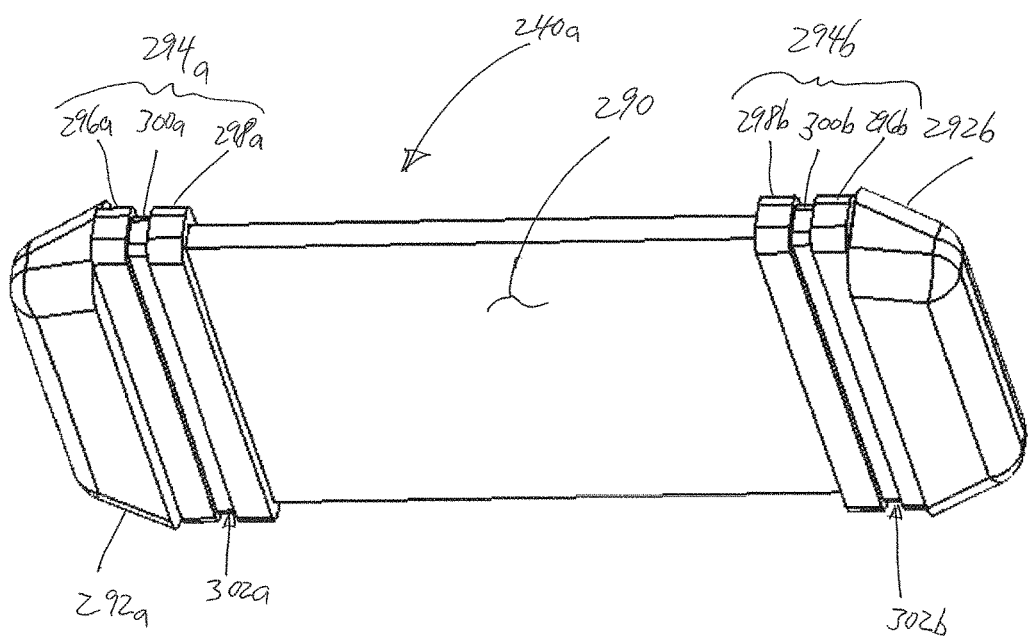
FIG. 16 is a perspective view of a strap of the car seat shown in FIG. 15.

As shown in FIG. 16, belt 240a includes a generally flat web or strap 290. The strap includes ends 292a and 292b. Ends 292a and 292b are tapered outwardly so that they have a thinner profile at their outer sides than at their inner sides. Ends 292a and 292b can be formed from various materials including, but not limited to, ABS, plastic, webbing such as car seatbelt webbing, and ULTEM® 292a, 292b, or similar material. Belt 240a also includes two washers 294a and 294b located between the ends 292a and 292b. The ends 292a and 292b are relatively thicker than the washers 294a and 294b and the strap 290. The ends 292a and 292b retain the washers 294a and 294b on the strap 290. End 292a is constructed to be received through slot 224a in outer shell 220 while end 292b is constructed to be received through slot 238a in inner seat 230.

Washers 294a and 294b are formed of a compressible material, such as a foam manufactured by Sorbothane Inc. of Kent, Ohio. Washer 294a has an outer flange 296a, an inner flange 298a, and a web 300a connecting between the outer flange 296a and the inner flange 298a. A groove 302a is defined between the outer flange 296a, the inner flange 298a, and the web 300a. Groove 302a is formed around the periphery of the washer 294a. The washer 294a is constructed to be received in opening 224a of shell 220. The groove 302a is constructed so that the edge that defines opening 224a is seated in the groove 302a so that the shell 220 is sandwiched between the outer flange 296a and the inner flange 298a of the washer 294a. With the washer 294a so seated in the shell 220, relative movement of the washer 294a, such as due to movement of the strap 290 during impact of the vehicle, can cause compression and/or tension on the flanges 296a and 298a and the web 300a to absorb some of the energy imparted to the strap 290. For example, during an impact of the vehicle to which the car seat 210 is attached, tension in strap 290 can cause end 292a to contact and apply pressure to outer flange 296a of washer 294a, which will compress the outer flange 296a against the outer side of shell 220, thereby absorbing some of the energy of the impact.

Washer 294b has an outer flange 296b, an inner flange 298b, and a web 300b connecting between the inner and outer flanges. A groove 302b is defined between the outer flange 296b, the inner flange 298b, and the web 300b. Groove 302b is formed around the periphery of the washer 294b. The washer 294b is constructed to be received in opening 238a of inner seat 230. The groove 302b is constructed so that the edge that defines opening 238a is seated in the groove 302b so that the inner seat 230 is sandwiched between the outer flange 296b and the inner flange 298b of the washer 294b. With the washer 294b so seated in inner seat 230, relative movement of the washer 294b, such as due to movement of the strap 290 during impact of the vehicle, can cause compression and/or tension on the flanges 296b and 298b and the web 300b to absorb some of the energy imparted to the strap 290. For example, during an impact of the vehicle to which the car seat 210 is attached, tension in strap 290 can cause end 292b to contact and apply pressure to outer flange 296b of washer 294b, which will compress the outer flange 296b against the side of inner seat 230, thereby absorbing some of the energy of the impact.

The harness 250 is the same as harness 50, described above and, therefore, a description of harness 250 is omitted for sake of brevity.

Figure 17:
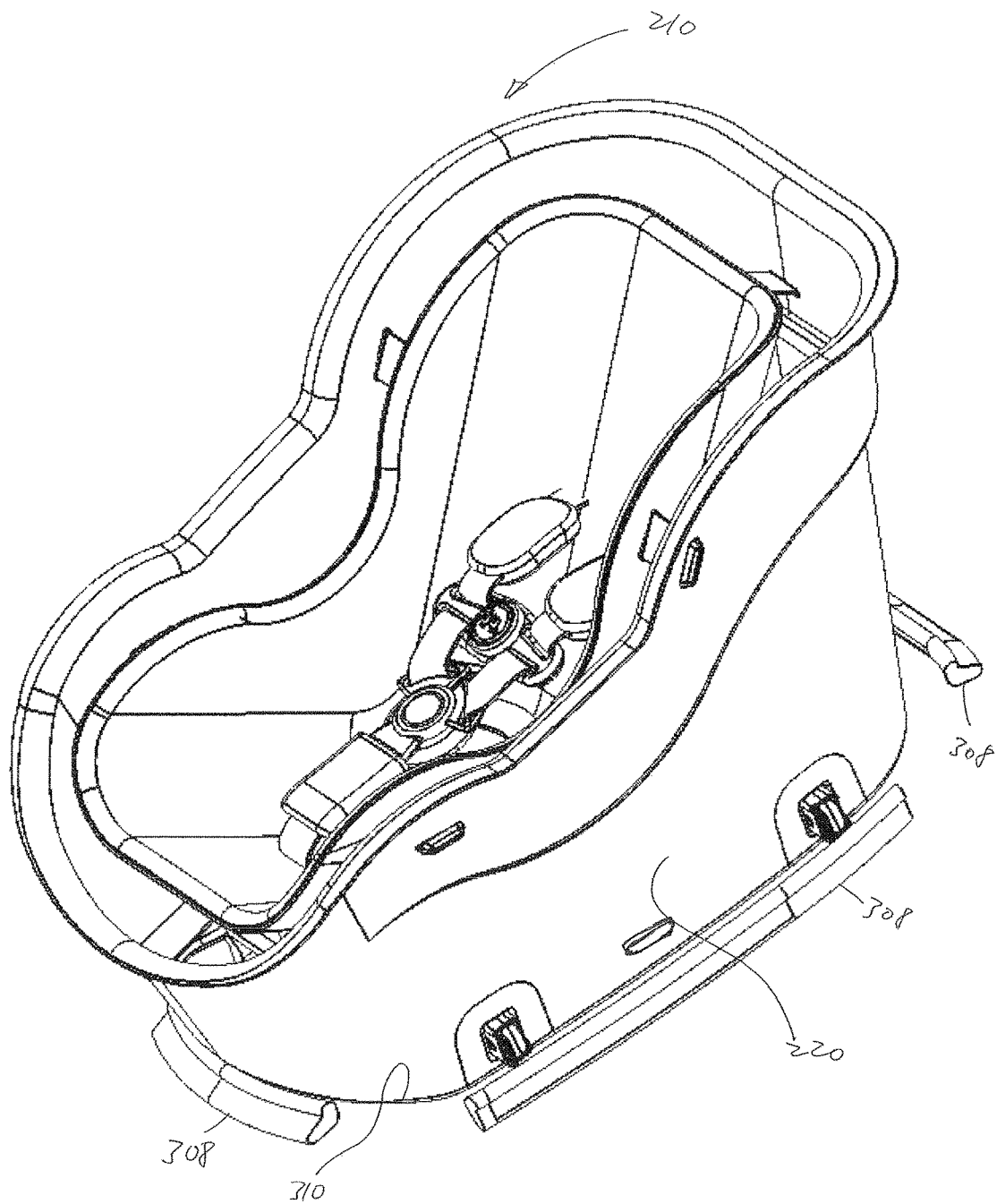
FIG. 17 is an exploded assembly view of the car seat shown in FIG. 7 and an optional compressible material.

FIG. 17 shows an exploded assembly view of the car seat 210 with optional compressible material 308, such as foam, constructed for attachment to the bottom side of outer shell 220. The compressible material 308 is attached to the bottom edge 310 of the outer shell 220 and acts to provide additional shock absorbency between the outer shell 220 and the vehicle seat (not shown). In one embodiment, the foam is about 1 inch thick when uncompressed. The foam can be made from various materials including, but not limited to Poron XRD foam (manufactured by Rogers Corporation of Rogers, Conn.) or similar materials.

Thus, it will be appreciated that the various embodiments of car seats described above employ layered shock absorbing/isolating arrangements, which together, act as a shock absorber/isolation system that can reduce the forces exerted on an occupant of the car seat during a vehicle collision. The outer shell is of extremely high strength and will remain structurally intact in almost all circumstances thereby further protecting the occupant of the car seat.

FIGS. 18 and 19 provides an alternate embodiment of a car seat 410 that is similar to car seat 10 of FIGS. 1-5, with similar elements numbered similarly but increased by "400". As shown in greatest detail in FIG. 19, car seat 410 includes an outer protective shell 420, an inner seat 430, a flexible suspension system 440 and a harness 450. The protective shell 420 is adapted as described below to be strapped or anchored to a car frame (not shown). The inner seat 430 is connected to the protective shell 420 by the flexible suspension system 440 such that the inner seat 430 can move (float) relative to the protective shell 420 as described below. Thus, the shell 420 provides support for the seat 430 (via the suspension system 440) but is not rigidly attached thereto. The harness 150 is attached to the inner seat 430 and not to the outer protective shell 420. A handle 460 connected to the shell 420 is optionally provided.

The outer protective shell 420 can be made from the same material as shell 20 of FIGS. 1-5. Shell 420 provides side and back walls 420a-420c and a front wall or slat 420d that connects the side walls 420a, 420b at the front of the car seat. The back wall 420c provides a high back compared to the front wall 420d which is low and short. The side walls are contoured to extend from the back to the front. The front, back and side walls provide an upper edge 421 to which or over which a seat cover may be attached as described hereinafter.

The inner seat 430 is scooped in shape with a relatively high back, a deep seat area (for the buttocks), and a slightly rising surface for the thighs and legs. The inner seat 430 is a protective seat made from a multi-layered construction. The inner seat 430 includes a hard outer shell layer 432, and a removable fabric or leather inner shell layer 439 that incorporates foam pillows (not shown) therein. The inner shell layer 439 fits in or around the edge of the outer shell layer 432 and does not inhibit the inner seat 430 from moving relative to the outer protective shell 420. The inner seat 430 also defines a plurality of (e.g., eight) slots 438 for receiving the belts of the suspension system 440, and a series of slots 441 in outer shell 432 and corresponding slots 442 in inner shell layer 439 for receiving belt(s) 452 of the harness system 450. The hard outer shell layer 432 of inner seat 430 may be formed from the same materials discussed above with reference to shell 32 of FIGS. 1-5.

The suspension system 440 functions to suspend the inner seat 430 relative to the outer shell 420 and to thereby act as a shock absorber/isolator between the shell 420 and the seat 430. The suspension system 440 is a seven-point suspension system with seven webs or belts or straps 440a-440g. The straps 440a-440g may be configured and formed in a manner such as straps 240a-240g of FIGS. 15 and 16.

The outer protective shell 420 also defines a series of slots 424a-424g for receiving the straps 440a-440g of the suspension system 440. Eight slots are provided, including two slots each in top of side walls 420a, 420b, two slots each in the bottom of side walls 420a, 420b, a single slot in the front wall 420d of the car seat, a single slot in the top of the back wall 420c, a single slot in the top of the back wall 420c. Straps 440a-440g couple the shell 420 to the inner seat 430. Shell 420 also defines holes, slots, or surfaces for receiving a connection mechanism or support 466 for the handle 460.

One or more of the straps 440a-440g are formed of a deformable material. For example, the straps 440a-440g may be formed of an elastically and plastically deformable material. For example, the straps may be formed of a material that will behave elastically below a predetermined elastic load limit, but which will plastically deform at or above the load limit. The material may have an ultimate tensile load limit at which the material severs. The elastic load limit may be about 200 pound force (lbf)+/−50 lbf and the ultimate tensile load limit may be about 350 lbf+/−50 lbf. Such plastic deformation can absorb energy and limit recoil of the inner seat 430 after an impact. The straps 440a-440g are constructed so that given a certain range of forces transmitted to the seat 410, the straps 440a-440g will deform (elastically and/or plastically) while limiting the inner seat's movement so that it does not contact the outer shell 420. Such range of forces may be increased for a given strap construction by interposing padding 427 between the inner seat 430 and the outer shell 420, as discussed more fully below.

The straps 440a-440g may be formed of one or more different types of materials in order to obtain the overall elastic and plastic properties desired for the straps 440a-440g. Further, each strap 440a-440g may be constructed to have different load limits and elastic and plastic properties, or all or some of the straps 440a-440g may be constructed to have the same properties. Each respective strap 440a-440g may have different load deflection characteristics based on, for example, the location and direction of the strap with respect to the inner seat 430. In one embodiment, the straps have load deflection characteristics that are based on a predetermined travel distance of the inner seat 430 with respect to the outer shell 420. For example, strap 440e may be constructed to experience elastic or plastic deformation when the distance between the rear wall of the outer shell 420c and the back of the outer shell layer 432 is equal to or less than a predetermined amount. Such a predetermined amount may permit the strap 440e to plastically deform to absorb energy of a vehicle impact before a possible impact between the inner seat 430 and the outer shell 420.

Figure 21:
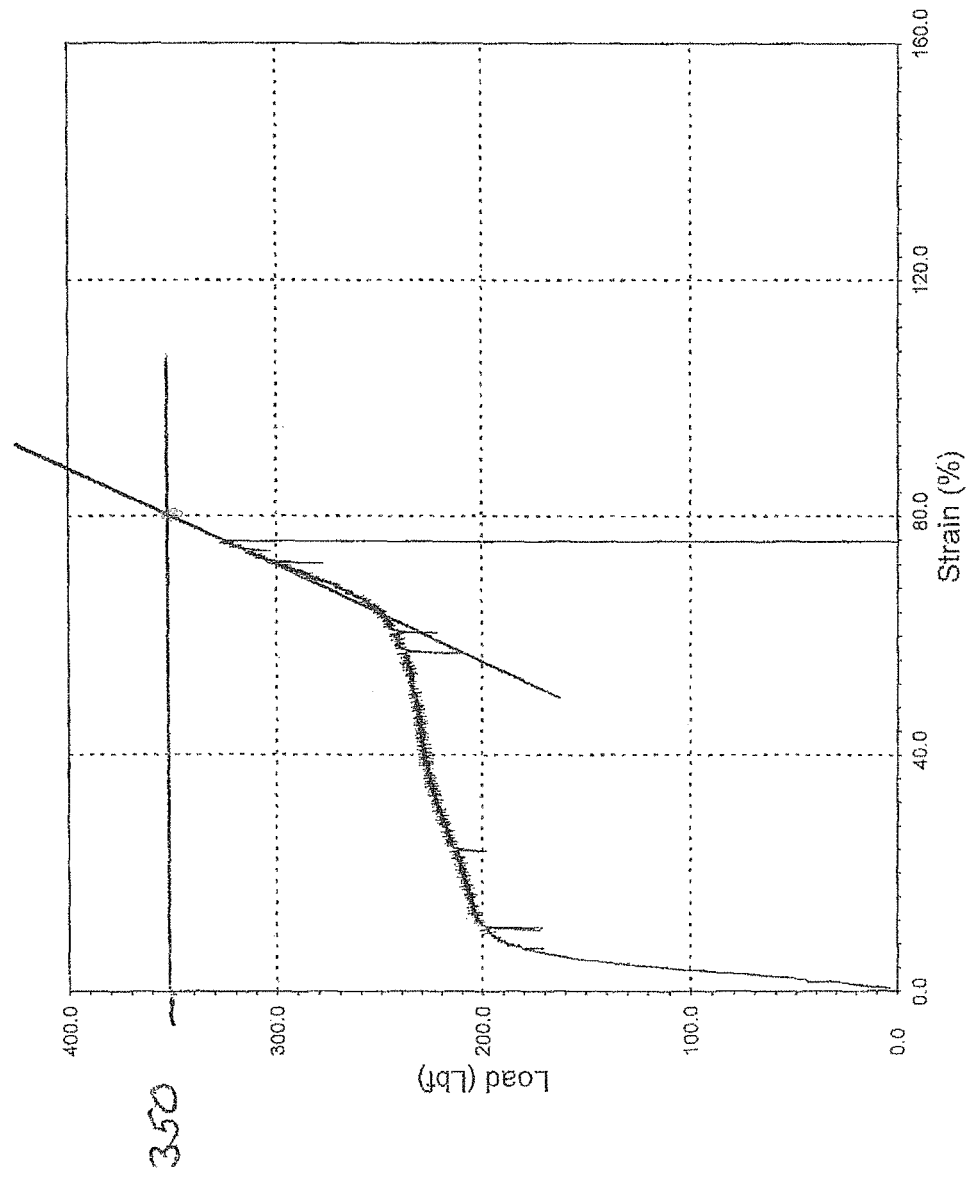
FIG. 21 is a graph showing a relationship between tensile load and strain for an embodiment of one of the straps of the car seat shown in FIG. 18.

In one embodiment, one or more of the straps 440a-440g may be formed as a woven strap of fibers of one or more materials, such as polyethylene terephthalate (PET) and polyester partially oriented yarn (POY) or blends thereof. The percentage of each type of fiber may be adjusted to obtain the elastic and plastic properties suitable for the straps 440a-440g. An example of the load/strain characteristic of a strap that includes PET and POY fibers is shown in FIG. 21. In its underformed, non-loaded state, the tested strap had a length of 5 inches. As shown in the graph, at a tensile load of 350 lbf applied to the strap, the strap stretched about 4 inches (80% strain). Also, the graph shows that the strap experienced elastic deformation up to about 200 lbf (e.g., the tensile load limit of the strap), and plastic deformation thereafter.

As a further measure of safety, one or more safety straps 480 (e.g. 480e, 480f) may be connected between the outer shell 420 and the inner seat 430 as redundant straps in the event that any of straps 440a-440g fail due to severing or severe plastic deformation. The safety straps 480 may have the same form as straps 440. However, the safety straps 480 are connected between the inner seat 430 and the outer shell 420 as secondary load bearing members having an ultimate tensile load limit that is greater than that of the straps 440a-440g. The ultimate tensile load limit of the safety straps can be twice the ultimate tensile load of any of straps 440a-440g. For example, in one embodiment, one of the straps 440a-440g has an ultimate tensile load limit of about 350 lbf+/−50 lbf, and a respective safety strap 480 has an ultimate tensile load of about 700 lbf+/−50 lbf. The safety straps 480 may be connected in parallel with one or more of the straps 440a-440g using the same openings 424a-424h in the outer shell 420 and openings 438 in the outer shell layer 432 of the inner seat 430. For example, in the embodiment shown in FIG. 19, safety straps 480e and 480f are connected in parallel, respectively, with straps 440e and 440f When connected in parallel, each of the safety straps 480e and 480f has an undeformed length that is longer than the undeformed length of the straps 440e and 440f Preferably, the safety straps 480e and 480f are constructed so that they do not experience a tensile load until and unless a case where the respective straps 440e or 440f has deformed to the point that the inner seat 430 has contacted the outer shell 420 in the vicinity of the straps 440e or 440f Therefore, even if the straps 440e and 440f are severed or are severely deformed, safety straps 480e and 480f will remain connected and load bearing between the respective openings 424e and 424f in the outer shell 420 and the corresponding openings 438 in outer shell layer 432 of inner seat 430.

Also, a plurality of padding elements 427 are spaced around the inside surface 420e of the shell 420. The padding elements 427 are located such that should the shell 420 be subjected to significant forces and movement relative to the seat 430, the padding elements 427 will contact the seat 430 and largely prevent the inside surface 420e of the shell 420 from contacting the seat 430.

In one embodiment, a plurality of optional padding elements 427 are spaced around the inside surface 420e of the shell 420. The padding elements 427 may be formed from the same materials discussed above with reference to padding elements 427 of FIGS. 1-5. The padding elements 427 are located such that should the shell 420 be subjected to significant forces and movement relative to the seat 430, the padding elements 427 will contact the seat 430 and largely prevent the inside surface 420e of the shell 420 from contacting the seat 430.

Figure 20A:
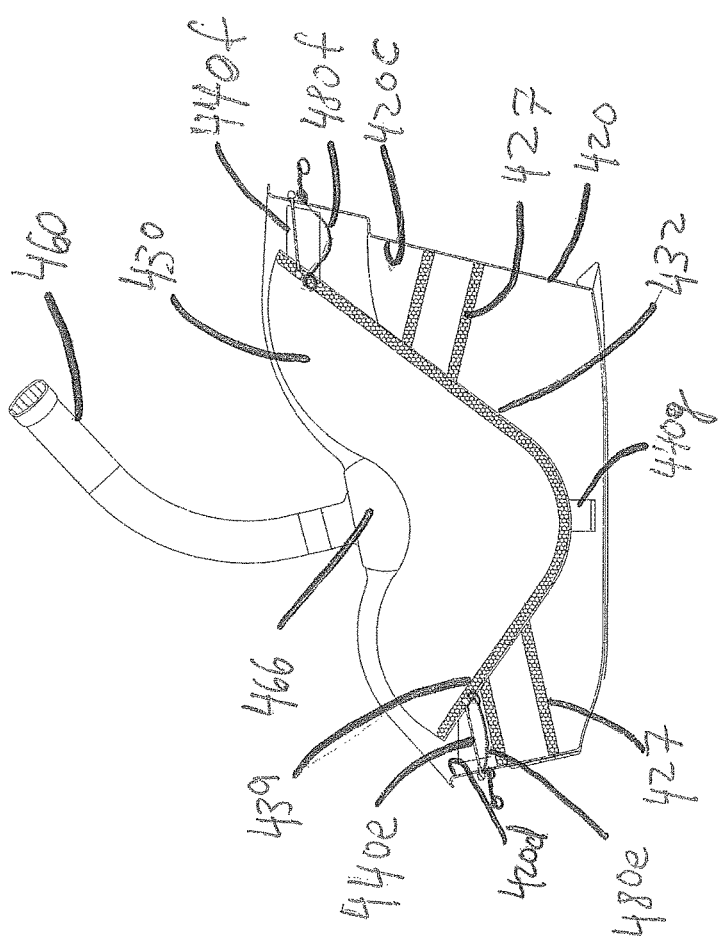
FIG. 20a is a cross-sectional view of the car seat of FIG. 18 taken at 20-20 of FIG. 18.

Also, in one embodiment, the padding elements 427 are thick enough so that they extend from the inside surface 420e and contact the seat 430 so that should the shell 420 be subjected to significant forces and movement relative to the seat 430, the padding elements 427 will already be in contact with the seat 430 to absorb energy from the moving seat 430. For example, FIG. 20a shows a view of car seat 410 shown in FIG. 18 along section 20-20, showing foam pads 427 that extend between and contact the back wall 420c and the hard outer shell layer 432, the front wall 420d and the outer shell layer 432, and between the side walls 420a, 420b and the outer shell layer 432. The foam pad 427 between the back wall 420c and the outer shell layer 432 and the foam pad 427 between the front wall 420d and the outer shell layer 432 are shown as being formed as tubular or annular compression elements formed of foam and having a hollow core. The tubular foam pads 427 extend along axis A-A (FIG. 18) that is centered between sides 420a and 420b of the outer shell 420. The foam may be energy absorbing compression material such at least one of viscoelastic foam, hyper elastic elastomer, polyurethane open or closed cell foam, expanded polystyrene (EPS), expanded polypropylene (EPP). Moreover, multiple types of such foam having varying foam densities can be used in combination. While tubular and cylindrical pads are shown in the embodiment shown in FIG. 19, it will be appreciated that any shapes of the pads may be used and that foam padding or other energy absorbing materials can be interposed completely to fill the space between the inner seat 430 and the outer shell 420 provided that inner seat 430 can still easily move relative to the outer protective shell 432 with multiple degrees of freedom. Moreover, the specific padding materials used and their construction may depend on the relative location of the padding between the inner seat 430 and the outer protective shell 432.

It should also be appreciated that the car seat 410 can be installed in at least two orientations along axis A-A: a first orientation in which the front wall 420d faces the seatback of a vehicle (rear facing); and a second orientation in which the back wall 420c faces the seatback of the vehicle (forward facing). During a frontal or rear impact of the vehicle (an impact substantially directed along axis A-A), for example, regardless of whether the car seat 410 is oriented forward-facing or rear-facing, movement of the inner seat toward either of the front wall 420d or back wall 420d will tend to compress one of the front or rear tubular foam pads 427 to absorb some energy from the impact and will slow the movement of the inner seat 430 so that it does not impact the outer shell 420 with as much force than if the tubular foam pads 427 were not present. Also, it will be appreciated that each tubular foam pad 427 is opposed by a strap, such as straps 440e or 440f, so that each opposed tubular foam pad 427 and strap 440e, 440f, function as a tension/compression pair to absorb energy in the event of a frontal or rear collision. For example, when the rear tubular foam pad 427 is in compression, strap 440e will be in tension. Similarly, when the front tubular foam pad 427 is in compression, strap 440f will be in tension. It will be appreciated that the incorporation of the tubular elements 427 can reduce the severity of the load and deformation of straps 440e and 440f by absorbing some of the energy of the impact.

In one embodiment of the car seat 410 shown in FIG. 20b, an energy absorber 443 is interposed between a front end 445 of strap 440e and front wall 420d around slot 424e. As noted above, the slot 424e may not be visible from the outside of the outer shell 420, but instead may be formed in an inner wall spaced slightly rearward of wall 420d so that the front end 445 of strap 440e is disposed between the inner wall and wall 420d, in which case the energy absorber 443 will also be located therebetween. Regardless of whether the energy absorber 443 is located on the inside or outside of shell 420, the energy absorber 443 may be formed of foam or another compressible material. The foam may be energy absorbing compression material such at least one of viscoelastic foam, hyper elastic elastomer, polyurethane open or closed cell foam, expanded polystyrene (EPS), expanded polypropylene (EPP). Moreover, multiple types of such foam having varying foam densities can be used in combination. For example, in one embodiment the energy absorber 443 and the strap 440e are constructed so that the tensile forces transmitted through strap 440e during impact will tend to compress the foam energy absorber 443 before (or possibly instead of) deforming the strap 440e, thereby reducing the energy transmitted to the seat 430. Also, additional energy absorbers having similar structure and function to that of absorber 443 can be added to the ends of some or all of the other straps 440a-440d and 440f-440g. Each respective energy absorber may have different energy absorbing characteristics based on, for example, the location and direction of the strap with respect to the inner seat 430.

Although not shown in FIGS. 18 to 20b, a harness like harness 50 of FIG. 1 can be included with seat 410. For example, the central (crotch) belt of harness 50 may be attached through slot 439 (FIG. 19) of outer shell layer 432 and shoulder belts and lap belts attached through similar slots of the outer shell layer 432.

Optional handle 460 is attached by support mechanisms 466 to respective sides 420a, 420b of the shell 420. In one embodiment, shell 420 also defines holes or slots (not shown) for receiving the support mechanisms 466 for the handle 460. Handle 460 may swivel relative to support mechanisms 466 as is known in the art. In addition, it is possible for the handle to swing against the back of a vehicle seatback when it is installed in a vehicle to provide leverage to the car seat 410 to prevent rotation of the car seat 410 toward the seatback upon the car seat recoiling after a vehicle impact. In the event of an impact or sudden change in velocity of the vehicle in which the car seat 410 is carried, the handle 460 retards inertia-induced rotation of the car seat 410 by transmitting rotational force applied to the car seat 410 into the seatback of the vehicle seat.

The embodiments described with reference to FIGS. 18 to 21 provide a highly protective, safe, and strong car seat system similar to that of the embodiments described with reference to FIGS. 1-5.

FIGS. 22 and 23 show an embodiment of a car seat 510 constructed the same as that of car seat 410, except that car seat 510 has an inner seat 530 which is different from inner seat 430 in that it has substantially no sides facing sides 420a, 420b of outer shell 420. However, with the exception noted, inner seat 530 is constructed identically to seat 430. The removal of the material from the sides of the inner seat 530 provides more room for a larger child to sit in the seat 530, thus increasing the utility of the car seat 510 for children as they grow. For smaller children, the removed sides of the inner seat 530 can be accommodated by using thicker cushions or bolsters (not shown) with the seat 530. Such thicker cushions may be removable or replaced with thinner ones to accommodate children of various sizes.

FIG. 23 shows a view of the car seat 510 shown in FIG. 22 along section 23-23 in FIG. 22. Although not shown in FIG. 23 for the sake of clarity, pads 427 may surround the inner seat 530 in the same way described above and shown in FIGS. 19, 20a, and 20b. Also, although not shown in FIG. 23 for sake of clarity, energy absorbers 443 may be employed on one or more of straps 440e, 440f or the other straps comprising the suspension system 440. All other aspects of the car seat 510 are the same as those described above for car seat 410, and are not repeated here for the sake of brevity.

FIG. 24 shows an embodiment of a car seat 610, constructed in much the same way as car seat 410, but differs in the construction of the inner seat 430 and attachment of handle 460 and support mechanisms 466. The car seat 610 includes an inner seat 630 that is comprised of an outer shell layer 632 that is removably coupled to an inner shell layer 634. The outer shell layer 632 is constructed similarly to outer shell layer 432 of FIG. 19 and has a plurality of openings 638 like openings 438 that are constructed to receive a plurality of flexible straps 440a-440g of suspension system 440. The car seat 610 also includes a handle 660. However, unlike handle 460 of car seat 410, the handle 660 of car seat 610 is connected to the inner shell layer 634, which defines holes, slots, or surfaces for receiving a connection mechanism or support 666 for the handle 660. The handle 660 can be used to transport the inner shell layer 634 when it is separated partially or fully from the outer shell layer 632.

FIG. 25 shows a front side elevation view of the car seat assembly shown in FIG. 24. FIG. 26 shows a view of the car seat assembly shown in FIG. 25 along section 26-26 of FIG. 25, which is taken through the center of the car seat 610. The outer shell layer 632 includes a back clip 640 at a back edge of the outer shell layer 632 and a front clip 642 at a front edge of the inner shell layer 634. In the embodiment shown in FIG. 26 the back clip 640 and the front clip 642 are aligned longitudinally along the center of the car seat 610. In the embodiment shown in FIG. 26, the front clip 642 is fixed while the back clip is longitudinally movable and resiliently attached so that it can be displaced away from the car seat 610 yet will tend to move inwardly towards a rest position. In other embodiments, both the front clip 642 and the back clip 640 may be movable, while in other embodiments, the back clip 640 may be fixed and the front clip 642 may be moveable. Also, while clips are described as a means for coupling the inner shell layer 634 and the outer shell layer 632 together, it will be appreciated that in other embodiments, other coupling means may be employed to removably couple the inner shell layer 634 to the outer shell layer 632, including, without limitation, Velcro® (a trademark of Velcro Industries B.V., Netherlands Antilles), snaps, hooks, buttons, etc.

Figure 27:
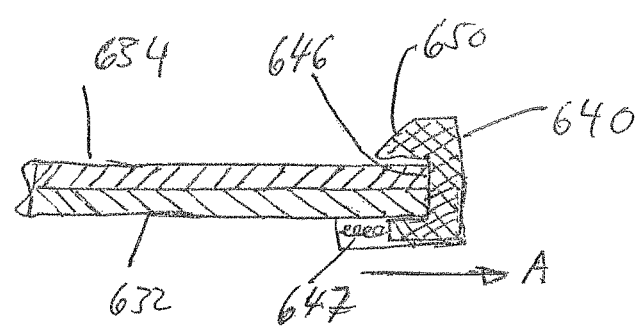
FIG. 27 is an exploded section view of a portion A shown in FIG. 26.

As noted above, in the embodiment shown in FIG. 26, the front clip 642 is fixed while the back clip 640 is movable. In use, to coupled the inner shell layer 634 to the outer shell layer 632, the front edge 644 of the inner shell layer 634 is engaged with the fixed front clip 642 and then the inner shell layer 634 is rotated toward the back clip 640. As the inner shell layer 634 is rotated and is almost fully seated in the outer shell layer 632, the back edge 646 engages the back clip 646. FIG. 27 shows a detailed section view of an embodiment of a back clip 640 and portions of the inner shell layer 634 and outer shell layer 632 shown in FIG. 26. The back clip 640 may be connected to the outer shell layer 632 with a spring 647 or elastic band that permits the clip 640 to move longitudinally away from an initial rest position. In one preferred embodiment, the back clip 640 has a ramp or camming surface 650 to engage the back edge 646 of the inner shell layer 634 so that after initially engaging the back edge 646 with the back clip, further rotation of the inner shell layer 634 will apply a downward force on the camming surface 650 sufficient to moves the back clip 640 longitudinally away from the car seat 610 and permit the clip 640 to snap into a locked engagement with the back edge 646 of the inner shell layer 634. Once the inner shell layer 634 is coupled to the outer shell layer 632, the back clip 640 can be moved manually in a direction of arrow A at least until it clears the back edge 646 of the inner shell layer 634. Once the back clip 640 clears the back edge 646, the inner shell layer 634 can be tilted up away from the clip 640 and the outer shell layer 632 and then disengaged from the front clip 642.

Thus, it will be appreciated that car seat 610 described above employs layered shock absorbing/isolating arrangements, which together, act as a shock absorber/isolation system that can reduce the forces exerted on an occupant of the car seat during a vehicle collision. The outer shell is of extremely high strength and will remain structurally intact in almost all circumstances thereby further protecting the occupant of the car seat. Further, the car seat 610 provides for removal and carrying of only a portion of the car seat 610, which can facilitate taking the occupant of the car seat in an out of a vehicle to which the car seat 610 is attached. For example, instead of uninstalling the entire car seat 610 from the vehicle and moving the seat 610 out of the vehicle for carrying the occupant of the car seat outside of the vehicle, the car seat 610 allows for the outer shell of the car seat 610 to remain installed in the vehicle while a portion of the inner seat 630 can be detached from the car seat 610 and used as an occupant carrier outside of the vehicle. Thus, the person carrying the occupant in the inner shell layer need not carry the bulk and weight of the remaining parts of the car seat 610 when carrying the occupant outside of the vehicle and need not have to repeatedly reinstall the entire car seat 610.

FIG. 28 is an isometric view of an embodiment of a car seat 710 that is constructed in the same manner as car seat 410 with the exception of the inner seat 430. The car seat 710 has an inner seat 730 that has an outer shell layer 732 and an inner shell layer (FIG. 29). The car seat 710 also includes a harness 750 that has a plurality of belts 750a-750e coupled to a chest buckle 750f and a crotch buckle 750g. The outer shell layer 732 has a series of horizontal or diagonal slots 741 connected by vertical slots 743. The slots 741 have a width that is slightly more than the width of the belts 750a, 750b. Also, the slots 741 have a height that is at least twice the thickness of the belts 750a, 750b to permit the belts to be twisted or folded while in the slots 741. The vertical slots 743 have a width that is slightly more that the thickness of the belts 750a, 750b. The vertical slots 743 intersect the slots 741 close to the midpoint of the slots 741. As shown in FIG. 28, the slots 741 are equally spaced along a longitudinal direction along a back portion of the outer shell layer 732.

FIG. 29 shows the inner shell layer 739 of the inner seat 730 of the car seat 710. The inner shell layer 739 fits in or around the edge of the outer shell layer 732 shown in FIG. 28 so that the inner shell layer 739 covers an upper side of the outer shell layer 732. The inner shell layer 739 also has horizontal or diagonal slots 745 corresponding to slots 741 shown in FIG. 28 and has vertical slots 747 corresponding to slots 743 shown in FIG. 28. When the inner shell layer 739 is fitted to the outer shell layer 732 (FIG. 28), slots 741 and 745 align and slots 743 and slots 747 align. Slots 741, 745, 743, and 747 define a pathway to route belts 752 of a harness 750.

Although not shown in FIGS. 28 and 29, belts 750a and 750b pass through the slots 741, 745, 743, and 747 behind the inner seat 730 and are connected together with a y-clip or a t-clip that his connected to an adjustment strap that is retained by an adjuster, as is known in the art. Straps 750a and 750b extend from the inner seat 730 at a height dependent on the specific horizontal or diagonal slots 741 and 745 in which the belts are routed. Such belt routing is adjustable to accommodate different shoulder heights of different occupants of the seat 710. Adjustment of the straps 750a and 750b is facilitated by the arrangement of slots 741, 745, 743, and 747, as noted below with reference to FIGS. 30a to 30c.

FIGS. 30a to 30c illustrate how the position of strap 752a can be adjusted in slots 741 and 743. It will be appreciated that such positioning is also accomplished simultaneously through aligned slots 745 and 747 in inner shell layer 739, although those slots are not shown in FIGS. 30a to 30c for clarity of illustration. FIG. 30a shows belt 750a positioned in a first slot 741a. To reposition belt 750a into a second slot 741b, as shown in FIG. 30c, the belt 750a is twisted vertically and slides edgewise downward through slot 743 between slots 741a and 741b as shown in FIG. 30b. Once the belt 750a is positioned at slot 741b, it is twisted horizontally into slot 741b as shown in FIG. 30c.

There have been described and illustrated herein several embodiments of a car seat. While particular embodiments have been described, it is not intended that the claims be limited thereto, as it is intended that the claims be as broad in scope as the art will allow and that the specification be read likewise. Thus, while particular materials for shell have been disclosed, it will be appreciated that other materials may be used as well provided they supply sufficient strength for the suspension system and structural integrity for the system. Similarly, while particular types of materials have been disclosed for the inner seat layers, it will be understood that other materials can be used. Further, while the suspension system has been described as being comprised of belts or webs, it will be appreciated that other or additional suspension elements may be utilized. It will therefore be appreciated by those skilled in the art that yet other modifications could be made without deviating from the spirit and scope of the claims.

What is claimed is:

1. A car seat for an occupant, comprising:
a) a unitary inner seat having a seat portion and a back portion continuous with said seat portion thereby preventing relative rotation between said back portion and said seat portion;
b) an outer protective shell having a front wall, a back wall, and opposing side walls extending around and protecting said inner seat, said outer protective shell configured to be connected to a vehicle; and
c) a suspension system coupling and permitting relative movement between said inner seat and said outer protective shell, said suspension system suspending said inner seat substantially within said outer protective shell between said front wall, back wall, and opposing side walls thereof,
wherein said suspension system includes at least a first and second flexible and deformable member connected between said inner seat and respective said opposing side walls of said outer protective shell, a third flexible and deformable member connected between said inner seat and said front wall of said outer protective shell, and a fourth flexible and deformable member connected between said inner seat and said back wall of said outer protective shell, where said first, second, third and fourth flexible and deformable members are elastically and plastically deformable such that each respective flexible and deformable member has a first at-rest state having a first length, a second elastically deformed state having a second length greater than its first length when said outer protective shell is moving relative to said inner seat, and a third plastically deformed state having a third length greater than said second length, when the deformable member has exceeded its elastic load limit with said protective shell continuing to move relative to said inner seat but before said inner seat hits said outer shell.

2. The car seat according to claim 1, wherein said first and second flexible and deformable members connected between said inner seat and said opposing side walls of said outer protective shell are connected to a buttocks area of said inner seat.

3. The car seat according to claim 1, wherein said third flexible and deformable member connected between said front wall of said outer protective shell and said inner seat is connected to a leg area of said inner seat.

4. A car seat for an occupant, comprising:
a) an inner seat having a seat portion and a back portion;
b) an outer protective shell having a front wall, a back wall, and opposing side walls extending around and protecting said inner seat, said outer protective shell configured to be connected to a vehicle; and
c) a suspension system coupling and permitting relative movement between said inner seat and said outer protective shell, said suspension system suspending said inner seat substantially within said outer protective shell between said front wall, back wall, and opposing side walls thereof, wherein said suspension system includes at least a first and second flexible and deformable member connected between said inner seat and respective said opposing side walls of said outer protective shell, a third flexible and deformable member connected between said inner seat and said front wall of said outer protective shell, and a fourth flexible and deformable member connected between said inner seat and said back wall of said outer protective shell, where said first, second, third and fourth flexible and deformable members are elastically and plastically deformable such that each respective flexible and deformable member has a first at-rest state having a first length, a second elastically deformed state having a second length greater than its first length when said outer protective shell is moving relative to said inner seat, and a third plastically deformed state having a third length greater than said second length, when the deformable member has exceeded its elastic load limit with said protective shell continuing to move relative to said inner seat but before said inner seat hits said outer shell.

5. The car seat according to claim 4, wherein said first and second flexible and deformable members connected between said inner seat and said opposing side walls of said outer protective shell are connected to a buttocks area of said inner seat.

6. The car seat according to claim 4, wherein said third flexible and deformable member connected between said front wall of said outer protective shell and said inner seat is connected to a leg area of said inner seat.

7. A car seat for an occupant, comprising:
a) an inner seat having a seat portion and a back portion;
b) an outer protective shell having a front wall, a back wall, and opposing side walls extending around and protecting said inner seat, said outer protective shell configured to be connected to a vehicle; and
c) a suspension system coupling and permitting relative movement between said inner seat and said outer protective shell, said suspension system suspending said inner seat substantially within said outer protective shell between said front wall, back wall, and opposing side walls thereof, wherein said suspension system includes at least one flexible and deformable member connected between said inner seat and said outer protective shell, where said at least one flexible and deformable member is elastically and plastically deformable and has a first at-rest state having a first length, a second elastically deformed state having a second length greater than its first length when said outer protective shell is moving relative to said inner seat, and a third plastically deformed state having a third length greater than said second length, when the deformable member has exceeded its elastic load limit with said protective shell continuing to move relative to said inner seat but before said inner seat hits said outer shell.

* * * * *